United States Patent
Castellani et al.

(10) Patent No.: US 8,621,362 B2
(45) Date of Patent: Dec. 31, 2013

(54) MOBILE SCREEN METHODS AND SYSTEMS FOR COLLABORATIVE TROUBLESHOOTING OF A DEVICE

(75) Inventors: Stefania Castellani, Meylan (FR); Jean-Luc Meunier, St Nazaire les Eymes (FR); Frederic Roulland, Le Versoud (FR)

(73) Assignee: Xerox Corporation, Norwalk, CT (US)

( * ) Notice: Subject to any disclaimer, the term of this patent is extended or adjusted under 35 U.S.C. 154(b) by 161 days.

(21) Appl. No.: 13/010,896

(22) Filed: Jan. 21, 2011

(65) Prior Publication Data

US 2012/0192077 A1    Jul. 26, 2012

(51) Int. Cl.
*G06F 3/048*    (2013.01)

(52) U.S. Cl.
USPC .......................................... 715/740; 715/756

(58) Field of Classification Search
USPC ................................. 715/740, 756
See application file for complete search history.

(56) References Cited

U.S. PATENT DOCUMENTS

| | | | |
|---|---|---|---|
| 5,038,319 A | 8/1991 | Carter et al. |
| 5,057,866 A | 10/1991 | Hill, Jr. et al. |
| 5,087,971 A | 2/1992 | Sakata et al. |
| 5,216,514 A | 6/1993 | Hong et al. |
| 5,218,406 A | 6/1993 | Ebner |
| 5,325,156 A | 6/1994 | Ulinski |
| 5,365,310 A | 11/1994 | Jenkins et al. |
| 5,369,469 A | 11/1994 | Leo et al. |
| 5,404,503 A | 4/1995 | Hill et al. |
| 5,457,780 A | 10/1995 | Shaw et al. |
| 5,557,342 A | 9/1996 | Eto et al. |
| 5,636,008 A | 6/1997 | LoBiondo et al. |
| 5,774,663 A | 6/1998 | Randle et al. |
| 5,826,008 A | 10/1998 | Bluvband |
| 5,854,828 A | 12/1998 | Kocis et al. |
| 5,983,369 A | 11/1999 | Bakoglu et al. |
| 5,991,805 A | 11/1999 | Krukovsky |
| 6,058,372 A | 5/2000 | Sweet et al. |
| 6,173,422 B1 | 1/2001 | Kimura et al. |
| 6,269,122 B1 | 7/2001 | Prasad et al. |
| 6,279,125 B1 | 8/2001 | Klein |
| 6,285,932 B1 | 9/2001 | de Bellefeuille et al. |
| 6,289,380 B1 | 9/2001 | Battat et al. |
| 6,323,846 B1 | 11/2001 | Westerman et al. |
| 6,442,712 B1 | 8/2002 | Jeon |
| 6,487,375 B2 | 11/2002 | Ferrer et al. |

(Continued)

FOREIGN PATENT DOCUMENTS

| | | |
|---|---|---|
| EP | 1386199 B1 | 6/2006 |
| WO | WO0063763 A1 | 10/2000 |

(Continued)

OTHER PUBLICATIONS

U.S. Appl. No. 12/689,737, filed Jan. 19, 2010, Meunier et al.

(Continued)

*Primary Examiner* — Andrea Leggett
(74) *Attorney, Agent, or Firm* — Fay Sharpe LLP

(57) ABSTRACT

This disclosure provides collaborative communication systems and methods to facilitate troubleshooting of a device. Specifically, the disclosed systems and methods include a dynamic virtual representation of a device from the perspective of a user of the device which is shared with a remote troubleshooter. The dynamic virtual representation is based on the position of the user.

25 Claims, 13 Drawing Sheets

(56) References Cited

U.S. PATENT DOCUMENTS

| | | | |
|---|---|---|---|
| 6,493,083 B2 | 12/2002 | Parisi et al. | |
| 6,535,838 B2 | 3/2003 | Abraham et al. | |
| 6,553,238 B1 | 4/2003 | Ginzel et al. | |
| 6,591,524 B1 | 7/2003 | Lewis et al. | |
| 6,664,988 B1 | 12/2003 | Rollins | |
| 6,665,085 B1 | 12/2003 | Edmunds et al. | |
| 6,694,194 B2 | 2/2004 | Oda et al. | |
| 6,697,894 B1* | 2/2004 | Mitchell et al. | 710/73 |
| 6,721,404 B1 | 4/2004 | Lashley et al. | |
| 6,731,206 B2 | 5/2004 | Yang et al. | |
| 6,757,849 B2 | 6/2004 | Balluff | |
| 6,782,495 B2 | 8/2004 | Bernklau-Halvor | |
| 6,792,321 B2 | 9/2004 | Sepe, Jr. | |
| 6,862,589 B2 | 3/2005 | Grant | |
| 6,885,469 B1 | 4/2005 | Tanimoto | |
| 6,915,343 B1 | 7/2005 | Brewer et al. | |
| 6,957,365 B2 | 10/2005 | Gross et al. | |
| 7,149,936 B2 | 12/2006 | Deshpande et al. | |
| 7,155,277 B1 | 12/2006 | Brewer et al. | |
| 7,197,503 B2 | 3/2007 | Palanisamy et al. | |
| 7,518,745 B2 | 4/2009 | Guerraz et al. | |
| 7,561,988 B2 | 7/2009 | Matsunaga et al. | |
| 7,715,037 B2* | 5/2010 | Castellani et al. | 358/1.15 |
| 2001/0004241 A1 | 6/2001 | Fukano et al. | |
| 2002/0046368 A1 | 4/2002 | Friedrich et al. | |
| 2003/0009710 A1 | 1/2003 | Grant | |
| 2003/0161004 A1* | 8/2003 | Bolanos | 358/1.18 |
| 2003/0210659 A1 | 11/2003 | Chu et al. | |
| 2004/0103116 A1 | 5/2004 | Palanisamy et al. | |
| 2005/0172170 A1 | 8/2005 | Thieret et al. | |
| 2005/0222933 A1 | 10/2005 | Wesby | |
| 2006/0197973 A1 | 9/2006 | Castellani et al. | |
| 2007/0055767 A1 | 3/2007 | Victor | |
| 2007/0064594 A1 | 3/2007 | Norton | |
| 2008/0183852 A1 | 7/2008 | Pramer et al. | |
| 2009/0044130 A1 | 2/2009 | Saluja | |
| 2010/0125759 A1 | 5/2010 | Roulland | |
| 2010/0229080 A1 | 9/2010 | Roulland et al. | |
| 2010/0302173 A1 | 12/2010 | Deng et al. | |

FOREIGN PATENT DOCUMENTS

| | | |
|---|---|---|
| WO | WO02091088 A2 | 11/2002 |
| WO | WO03098908 A1 | 11/2003 |
| WO | WO2004046953 A1 | 6/2004 |

OTHER PUBLICATIONS

M. Bauer, G. Korteum, Z. Segall, , "Where are you pointing at?", Reality-Augmenting Telepointer Proc. of ISWC, 1999.

CALEA, Communications Assistance for Law Enforcement Act of 1994, http://www.askcalea.net/calea.htm, Approved Oct. 25, 1994; Updated Jan. 17, 2005.

Jason Halper "SAFE: IP Telepony Security in Depth", (white paper) Cisco System, Inc., 1992-2003 http://www.cisco.com/en/US/tech/tk652/tk701/technologies_white_paper09186a00800ae41c.shtml.

Julie Giera, IT Management: Outsourcing "Outsource to cut print costs by up to 30%", Computer Weekly.com, Apr. 1, 2004, http://www.computerweekly.com/Article_129651.htm.

Feiner, et al., "Knowledge-based augmented reality",Communications of the ACM, 36(7), Jul. 1993, pp. 52-62.

U.S. Department of Health & Human Services, Office for Civil Rights—HIPAA, "Medical Privacy—National Standards to Protect the Privacy of Personal Health Information", Last revised Sep. 16, 2004, http://www.hhs.gov/ocr/hipaa/, 5 pages, Feb. 10, 2005.

U.S. Department of Health & Human Services , Office of the Secretary, 45 CFR Parts 160, 162, 164 Health Insurance Reform: Security Standards; Final Rule, *Federal Register*, vol. 68, No. 34, Feb. 20, 2003.

HP Instant Support, http://davesipaq.com/forum/archive/index.php/t-2611.html, Apr. 12, 2004, copyright of Dave's iPAQ 2005.

HP UK Total Print Management, Hewlett-Packard Development Company, L.P. copyright 2004, http://h30046.www3.hp.com/solutions/solutionhome.php?topiccode=IPG_TPM®ioncode+NA&langcode+USENG.

Mika Marjalaakso, "Security Requirements and Constraints of VoIP", Helsinki University of Technology, Department of Electrical Engineering and Telecommunications, http://www.hut.fi/~mmarjala/voip, Feb. 10, 2005.

Microvision, Inc., "Nomad Expert Technician System: Info" copyright 1993-2005, http://www.mvis.com/nomadexpert/info.html.

Microvision, Inc., Nomad Expert Technician System Automotive MRO Whitepaper, "Augmented Vision for Automotive MRO", copyright 2003, http://www.mvis.com/pdfs/nomad_industry.wp.pdf.

D. Richard Kuhn, Thomas J. Walsh, Steffen Fries, "Security Considerations for Voice Over IP Systems—Recommendations of the National Institute of Standards and Technology", National Institute of Standards and Technology (NIST), Technology Administration U.S. Department of Commerce, Special Publication 800-58, pp. 1-93, Jan. 2005, http://csrc.nist.gov/publications/drafts/NIST_SP800-58-040502.pdf.

OPTIO Software, Inc., "Solutions—Optio Print Manager The Business Need for Print Management", copyright 2005, http://www.optiosoftware.com/solutions/enterprise/PM/need.asp.

Fernando Robles, "The VoIP Dilemma, GIAC Security Essentials Practical Assignment, Version 1.4b, Option 1", Sans Institute 2004, http://www.sans.org/rr/papers/64/323.

J. Rosenberg et al., "SIP: Session Initiation Protocol", Internet Official Protocol Standards (STD 1), copyright 2002, The Internet Society, ftp://ftp.rfc-editor.org/in-notes/rfc3261.txt.

M. Baugher et al., RFC 3711—The Secure Real-time Transport Protocol (SRTP), copyright 2004, The Internet Society, http://www.faqs.org/rfcs/rfc3711.html.

T. Dierks et al., "RFC 2246—The TLS Protocol Version 1.0", copyright 1999, The Internet Society, http://www.faqs.org/rfcs/rfc2246.html.

Westbay Engineers Limited, "Lines to VoIP Bandwidth Calculator", Feb. 10, 2005 http://www.erland.com/calculator/lipb/.

Keiichi Yamazaki, A. Yamazaki, H. Kuzuoka, S. Oyama, H. Kato, H. Suzuki, H. Miki, "GestureLaser and GestureLAser Car—Development of an Embodied Space to Support Remote Instruction", ECSCW 1999.

Atkinson, J.M, and Drew P., "Order in Court: the Organization of Verbal Interaction in Judicial Settings", (1979) London, Macmillan.

Fussell, S.R., Kraut, R.E. and Siegel, J., "Coordination of communications: effects of shared visual context on collaborative work", Proceedings of the CSCW 2000 Conference on Computer Supported Cooperative Work, 21-30, New York: ACM.

Fussell, S., Setlock, L., Kraut, R., "Effects of head-mounted and scene-oriented view systems on remote collaboration on physical tasks", CHI 2003, pp. 513-520.

Fussell, et al., "Assessing the value of a cursor pointing device for remote collaboration on physical tasks", CHI 2003, pp. 788-789.

Fussell, S. et al. , "Gestures over video streams to support remote collaboration on physical tasks", HCI, 19, pp. 273-309.

Garfinkel, H. and Wieder, D.L. , "Two incommensurable, asymmetrically alternate, technologies of social analysis", in G. Watson and R. M. Seiler (eds) *Talk in context: contributions to ethnomethodology*, New York: Sage, pp. 175-206.

Gutwin, C and Penner, R., "Improving interpretation of remote gestures with telepointer traces", Proceedings of the CSCW 2002 Conference on Computer Supported Cooperative Work, pp. 49-57, New York: ACM.

Heath, C and Luff, P., Disembodied conduct: communication through video in a multimedia office environment. Proc. of CHI'91. ACM Press. 99-103.

Heath, C and Luff, P., "Media Spaces and communicative Asymmetries: Preliminary observations of Video-mediated Interaction". HCI7(3). pp. 315-346.

Heritage, J *Garfinkel and Ethnomethodology*, 1984, Cambridge: Polity Press.

Ishii, H., Kobayashi, M, Grudin, J., Integration of interpersonal space and shared workspace: ClearBoard Design and Experiments. ACM transactions on information systems. 11(4) pp. 349-375.

(56) References Cited

OTHER PUBLICATIONS

Kraut, R.E., Miller, M.D., and Siegel, J., "Collaboration in performance of physical tasks: Effects on outcomes and communication", Proceedings of the CSCW 1996 Conference on Computer Supported Cooperative Work, pp. 57-66, New York: ACM.

Kraut, R., Fussell, S and Siegal, J., "Visual Information as a Conversational Resource in Collaborative Physical Tasks", HCI Special Issue: *Talking about things*, 18(1&2), pp. 13-49.

Kuzuoka, H., Kosuge, T. and Tanaka, K., GestureCam: A video communication system for sympathetic remote collaboration, *Proceedings of the CSCW 1994 Conference on Computer Supported Cooperative Work*, pp. 35-43, New York: ACM.

Kuzuoka, H., Oyama, S., Yamazaki, K. Suzuki, K and Mitsuishi, M., "GestureMan: A mobile robot that embodies a remote instructor's actions", Proceedings of the CSCW 2000 Conference on Computer Supported Cooperative Work, pp. 155-162, New York: ACM.

Luff, P. et al., "Fractured Ecologies: Creating Environments for Collaboration", HCI Special Issue: *Talking about Things*, 18(1&2), pp. 51-84.

Martin, D. and Rouncefield, M., "Making the Organization Come Alive: Talking Through and About the Technology in Remote Banking", HCI Special Issue: Talking about Things, 18(1&2), pp. 111-148.

Ou, J. et al., "Gestural communication over video stream: supporting multimodal interaction for remote collaborative physical tasks," ICMI'03. ACM, pp. 242-249.

Sacks, H., "Lectures on Conversations, vols. I and II", Edited by G. Jefferson, Malden, MA; Blackwell (1992).

Schegloff, E.A., "Sequencing in conversational opening", American Anthropologist, 70, pp. 1075-1095.

Schegloff, E.A., "Notes on conversational practice: formulating place", in Sudnow, D (ed)., *Studies in Social Interaction*, New York: Free Press (1972).

Fussell, S., Setlock, L. and Parker, E, "Where do helpers look? Gaze targets during collaborative physical tasks.", *CHI 2003 New Horizons*, pp. 768, 769 (2003).

Xerox product literature for Xerox WorkCenter™ printer, downloaded from http://www.office.xerox.com/multifunction-printer/color-multifunction/workcentre-7655-7665-7675 on Dec. 23, 2009; 4 pages.

Konica Minolta product literature for bizhub™ C353P, downloaded from http://kmbs.konicaminolta.us/content/products/models/bizhubC353P.html on Dec. 23, 2009; 2 pages.

Newton's Telecom Dictionary; Feb. 2002; Eighteenth Edition; p. 168; CODEC definition.

Jacki O'Neill, Stefania Castellani, Antonietta Grasso, Frédéric Roulland, Peter Tolmie; "Representations can be good enough", *9th European Conference on Computer Supported Cooperative Work*, Paris—France, pp. 18-22, Sep. 2005.

Newton's Telecom Dictionary; Feb. 2002; Eighteenth Edition; p. 340-341; H.323 definition.

\* cited by examiner

MOBILE SCREEN METHODS AND SYSTEMS FOR COLLABORATIVE TROUBLESHOOTING OF A DEVICE

CROSS REFERENCE TO RELATED PATENTS AND APPLICATIONS

U.S. Pat. No. 7,715,037 to Castellani et al., entitled "BI-DIRECTIONAL REMOTE VISUALIZATION FOR SUPPORTING COLLABORATIVE MACHINE TROUBLE-SHOOTING," issued May 11, 2010;

U.S. patent application Ser. No. 12/967,210 to Roulland et al., entitled "METHOD AND SYSTEM FOR LINKING TEXTUAL CONCEPTS AND PHYSICAL CONCEPTS," filed Dec. 14, 2010; and U.S. patent application Ser. No. 12/689,737 to Meunier et al., entitled "DETACHABLE SCREEN FOR MULTIFUNCTION DEVICE SHOWING 3D DYNAMIC VIEWS," filed Jan. 19, 2010; are incorporated herein by reference in their entirety.

BACKGROUND

The present disclosure relates to diagnostic and customer-service systems for users of office equipment, such as copiers, printers, facsimile, and multifunction devices.

Office equipment, such as printers or copiers, typically uses a software-based operating system to perform essential machine functions and implement the various jobs of which the machine is capable. However, software, particularly that used in high-speed multi-function machines, is subject to various problems and faults. Additional problems also arise with the machine hardware which, in machines of this type, is extremely complex and sophisticated. Hardware and software problems that occur typically happen at a low, non-periodic rate and thus are very difficult to replicate when servicing the machine and therefore difficult to resolve. Further, many of these problems are identified by the customer, who is typically not technically trained to diagnose and service machines of this type. For this reason, it is important for a servicing organization to be able to access key machine operating information, and particularly information reflecting on the performance of the machine control system and physical states of machine componentry.

A common feature of the business arrangement between the user of the equipment and the supplier is that the user is responsible, at least in part, for some maintenance and basic trouble-shooting of the equipment. Often the equipment has componentry that can be tested, manipulated and perhaps replaced by the user, but in view of the investment in the equipment, users are reluctant to engage in system repair without the strong support of the supplier and its service departments. Accordingly, enhancing the accuracy and efficiency of equipment service is based on particularly articulating or determining equipment status and the occurring problem to a remote trouble-shooting service department. Frustrating experiences with the telephone communication-to-tech support departments is universally known and the problems with unsophisticated customers trying to actually communicate a problem to the department are extremely common.

Typically, when a user encounters a problem with a machine and cannot resolve it (or does not want to solve it himself), he (or a user representative) calls a support organization for assistance, such organizations typically have troubleshooters available to help. After salient details such as the machine serial number have been taken, the troubleshooter tries to ascertain the character and extent of the problem. When the nature of the problem and its possible causes have been uncovered, the troubleshooter will either propose some ways to attempt to resolve the problem or decide at this point that the call is best passed to higher level support. Where the troubleshooter attempts to get the user to resolve the problem, aside from his own knowledge and experience he may make use of a range of resources, such as an online knowledge base, physical machines, or the advice of colleagues.

The interactions between a user experiencing a problem with a machine and a troubleshooter on the phone recurrently involve a number of phenomena. The user and the troubleshooter between them build up a description of the problem that enables consideration of what an appropriate solution might be. This can include:

the provision by the user of an initial problem description, often containing a range of contextual information about the situation the problem has arisen in;

the reformulation of this description by the troubleshooter, into terms more specifically relevant to locating a solution;

affirmation/refinement of this description by the user;

potential further joint refinement of the problem/collation of other relevant features (either verbally or by getting the user to 'go look'); and, working together through instruction, implementation, and feedback to try out possible solutions.

In doing this work both the user and the troubleshooter routinely describe physical elements of the machine and give spatial directions or descriptions. It is often necessary to describe machine parts because users do not necessarily have the technical vocabulary to identify machine parts by name. The situation in which this particular problem with this particular machine arose has to be made available, where either party may only have partial information. The full extent of the problem also needs to be inquired into and made available. This may involve asking the user to undertake additional testing activities and report back. Potential solutions must be located and instructions given, followed, and their outcomes provided.

These interactions also typically take place under circumstances where the interactants only have access to an audio channel (telephone) which is not necessarily (physically) located by the machine, thereby requiring the user to negotiate a means of accessing the machine while retaining contact with the troubleshooter. The audio channel alone means that all descriptions, instructions and feedback are only verbal and the user will be the sole source of the initial problem description, circumstantial information, the results of the attempted instructions, etc. This can result in the troubleshooter requesting that the user repeat actions, either because they do not know the user has already done these, or because they cannot be sure the user has done these correctly. For the troubleshooter, where possible solutions come from textual resources, they will have to be digested from text and then articulated through purely verbal means. As a consequence of these circumstances a number of issues arise where the resolution is, at best, sub-optimal:

The user may lack access to the machine while on the phone and need to devote effort to coordinating access with others or constantly moving between the phone and the machine.

Troubleshooters will lack potentially significant and relevant information about the current machine status, the previous actions undertaken by the user, and the machine's previous behavior.

There is a lack of mutual access to the machine resulting in effort being devoted to:
  describing the current state and answering questions in order to arrive at a mutually agreed expression of the problem;
  producing instructions and directions and reporting back without being able to see how instructions and directions might be appropriately framed to the current circumstance (necessitating potentially redundant feedback and varying degrees of clarification); and
  working out ways together to ensure that they are referring to the same physical components of the machine.

Out of these observations it is possible to recognize two inter-related and potentially critical barriers to fully effective troubleshooting via conventional means:

1. The site of the problem is removed from the site of resolution for user-machine interactions. Excessive physical movement and coordination may be demanded, there is an absence of potentially important information to relevant parties, and both the problem and the resolution must always be mediated by verbal means.

2. The user-troubleshooter interaction is not best facilitated solely over the phone. Restriction to verbal mediation only diminishes the capacity to recognize the current state of the machine, the user situation, the object of reference, and the import of instructions.

The foregoing problems have suggested various needs for improved collaborative, distributed troubleshooting of network devices such as printers or MFDs ("multi-function devices"). There is a need for the improved communication of important information to be accomplished by the use of networking and user interface ("UI") capabilities with the equipment to handle the collaboration between the user and troubleshooter, and to use sensors and actuators (LEDs in the equipment).

INCORPORATION BY REFERENCE

U.S. Pat. No. 7,715,037 to Castellani et al., entitled "BI-DIRECTIONAL REMOTE VISUALIZATION FOR SUPPORTING COLLABORATIVE MACHINE TROUBLESHOOTING," issued May 11, 2010.

"DESIGNING TECHNOLOGY AS AN EMBEDDED RESOURCE FOR TROUBLESHOOTING," by S. Castellani, A. Grasso, J. O'Neill and F. Roulland, Journal of Computer Supported Cooperative Work (JCSCW), Volume 18, No. 2-3, pages 199-227, 2009.

U.S. patent application Ser. No. 12/689,737 by Meunier et al., entitled "DETACHABLE SCREEN FOR MULTIFUNCTION DEVICE SHOWING 3D DYNAMIC VIEWS," filed May 11, 2010.

U.S. Pat. No. 7,149,936 to Deshpande, entitled "INTERACTIVE MULTIMEDIA FOR REMOTE DIAGNOSTICS AND MAINTENANCE OF A MULTIFUNCTIONAL PERIPHERAL," issued Dec. 12, 2006.

U.S. Patent Application Publication No. 2010/0125759 to Roulland, entitled "SYSTEM AND METHOD FOR LOCATING AN OPERATOR IN A REMOTE TROUBLESHOOTING CONTEXT," published May 20, 2010.

BRIEF DESCRIPTION

In one embodiment of this disclosure, described is a communication system for supporting collaborative interactions between a device user and a troubleshooting advisor engaged in troubleshooting support activities for a device. The communication system comprises a device including a detachable display unit, the display unit configured to generate a dynamic virtual representation of the device from the view point of the device user; a remote troubleshooting interface configured to display the dynamic virtual representation of the device from the view point of the device user; and a communication link configured to provide bidirectional data communications between the detachable display unit and the remote troubleshooting interface, wherein the display unit is configured to update the dynamic virtual representation of the device based on the position of the device user relative to the device, and a sensed state of the device, and the communication system is configured whereby the dynamic virtual representation of the device is shared with the troubleshooting advisor.

In another embodiment of this disclosure, described is a method for troubleshooting a device operatively associated with a communication system for supporting remote interactions between a device user and a troubleshooting advisor. The communication system includes a detachable display unit operatively connected to the device, a troubleshooting interface operatively connected to the device, and a communication link operatively connecting the detachable display unit and the remote troubleshooting interface, the method comprising a) the detachable display unit generating and displaying a virtual representation of the device from the view point of the device user; b) the troubleshooting interface displaying the virtual representation of the device to the troubleshooting advisor; and c) dynamically updating the virtual representation of the device display to the device user and the troubleshooting advisor based on the position of the device user relative to the device and a sensed state of the device.

In still another embodiment of this disclosure, described is a printing system including an interactive communication system for supporting collaborative interactions between a printing system user and a troubleshooting advisor engaged in troubleshooting support activities for the printing system. The printing system comprises a printer; a detachable display unit, the display unit configured to generate a dynamic virtual representation of one or more areas of the printing system from the view point of the printing system user; a remote troubleshooting interface configured to display the dynamic virtual representation of the one or more areas of the printing system from the view point of the printing system user; and a communication link configured to provide bidirectional data communications between the detachable display unit and the remote troubleshooting interface; wherein the display unit is configured to update the dynamic virtual representation of the one or more areas of the printing system based on the position of the printing system user relative to the printing system, and a sensed state of the printing system, and the communication system is configured whereby the dynamic virtual representation of the one or more areas of the printing system is shared with the troubleshooting advisor.

DETAILED DESCRIPTION

Figure 1:
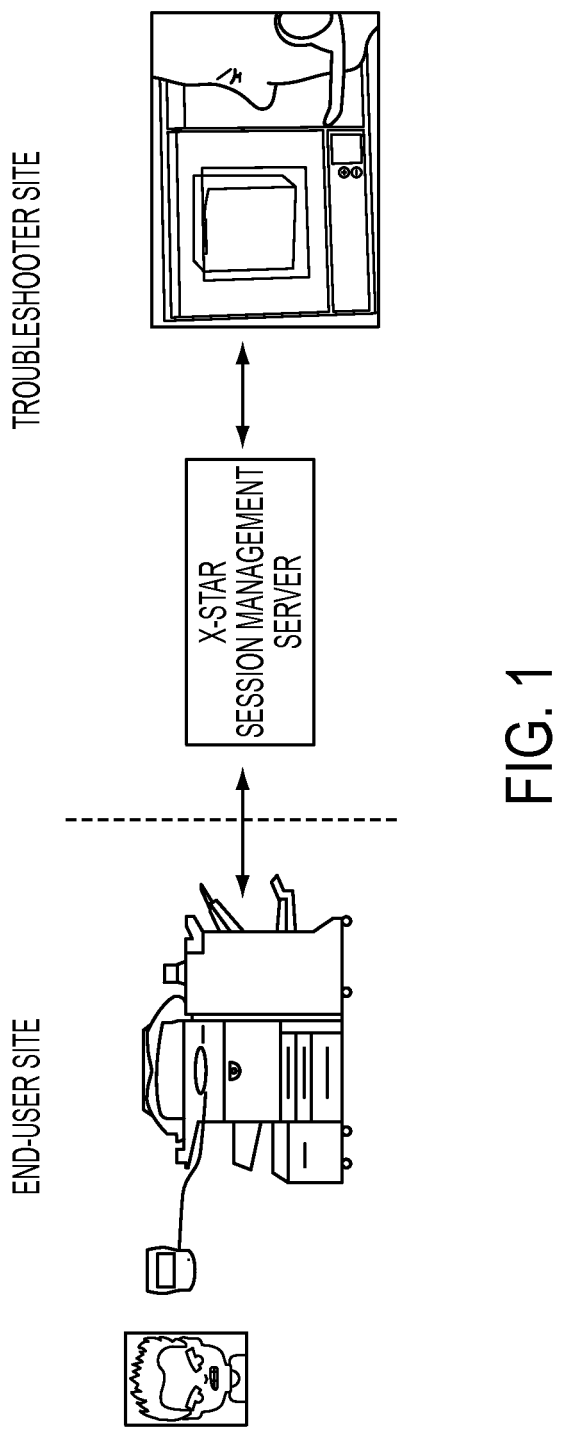
FIG. 1 illustrates an exemplary embodiment of a collaborative system according to this disclosure.

This disclosure, and the exemplary embodiments contained herein, provides methods and systems to augment the interaction between a device end-user and a remote troubleshooter. It is based on troubleshooting systems including a model of the device, together with the use of a mobile portable device including a screen, which the end-user detaches from the main device, and which will display the model according to the mobile screen position and orientation. According to exemplary embodiments disclosed, the troubleshooter is informed of the user position and also able to see the model from the perspective of end-user. The mobile device can transmit live information, be frozen on a viewpoint, and even guide end-user by displaying troubleshooter instructions. Providing the user's position seamlessly to the remote troubleshooter and offering both of them a shared view of the situation from the end users perspective provides an enhancement to a troubleshooting scenario to effectively troubleshoot and repair a device experiencing a failure mode.

Considered here is the situation of an end-user collaborating with a remote troubleshooter to solve a problem that the end-user has experienced with a device, e.g. an MFD. The disclosed collaborative troubleshooting methods and systems provide an extension to technology disclosed in U.S. Pat. No. 7,715,037 and U.S. patent application Ser. No. 12/689,737 related to collaborative troubleshooting systems. This extension comprises of using the position of a mobile or detachable screen around the MFD to build a view of the troubleshooting session that is both adapted to the end-user position and shared by both the user and the troubleshooter.

Substantially, this disclosure provides the following features not previously disclosed.

1. The use of a model, i.e., 3D, 2D or other, providing virtual views in a collaborative troubleshooting situation, where both the remote troubleshooter and the end-user share one such view, the latter being adapted to the position and/or orientation of the end-user around the device as well as to the sensed state of the device.

2. The support of a remote collaboration based on the shared dynamic view, following several modalities, including the capability for the end-user to indicate parts by positioning the screen in the appropriate direction.

3. The support for the detection of discrepancies between sensed and observed device' states.

As previously stated, considered here is the situation of an end-user collaborating with a remote troubleshooter to solve a problem that the end-user has experienced with a device, e.g. an MFD, printer, scanner, etc. The end-user and the troubleshooter typically communicate through the phone with the end-user describing problems and operations done and the troubleshooter providing instructions. In addition to audio communications such as those disclosed in U.S. Pat. No. 7,715,037 to Castellani et al., entitled "BI-DIRECTIONAL REMOTE VISUALIZATION FOR SUPPORTING COLLABORATIVE MACHINE TROUBLESHOOTING," issued May 11, 2010 and "DESIGNING TECHNOLOGY AS AN EMBEDDED RESOURCE FOR TROUBLESHOOTING," by S. Castellani, A. Grasso, J. O'Neill and F. Roulland, Journal of Computer Supported Cooperative Work (JCSCW), Volume 18, No. 2-3, pages 199-227, 2009, the presently disclosed methods and systems provide more advanced troubleshooting features.

According to U.S. Pat. No. 7,715,037, the end-user and the troubleshooter communicate through a shared 3D representation of the device status indicating parts of the device and suggesting troubleshooting steps, respectively on the device screen (for the end-user) and on a desktop (for the troubleshooter). However, since the screen is generally statically placed on the device, e.g. on top of an MFD, if the repair occurs on parts in other places the end-user cannot see the screen while the user is acting on those parts. Moreover, the displayed information requires some effort to be related to the actual physical device. This is due to the fact that the 3D representation of the device displayed on its screen is not contextualized to the current end-user' perspective. On the troubleshooter' side, even if the troubleshooter gets information about the device status through the 3D representation, the troubleshooter lacks information about the end-user' position relative to the device and what the user is looking at.

According to some aspects of this disclosure, these problems are addressed.

Provided is an augmentation of the interaction between an end-user and a troubleshooter using a collaborative troubleshooting system such as that disclosed in U.S. Pat. No. 7,715,037 to Castellani et al. and U.S. patent application Ser. No. 12/689,737 by Meunier et al.

The collaborative troubleshooting system of U.S. Pat. No. 7,715,037 enables a device' end-user experiencing a problem with a device to call a call centre directly from a device and to interact with a remote troubleshooter through the device itself. End-users and troubleshooters are provided with a shared representation of the device status. The shared representation mainly consists of a 3D model of the ailing device and a number of means of interacting with it adapted to the end-user' and troubleshooter' roles in the troubleshooting task. It is presented to the end-user on the device itself and to the troubleshooter's terminal, i.e., troubleshooter interface. The representation is linked to the device itself, such that actions on the device are shown on the representation, e.g. if a customer opens a door, that door will appear on the representation and the troubleshooter will see it. This is enabled through the sensors that reside on the devices. Reciprocal viewpoints are supported and interacting with this representation the end-user can indicate parts of the device to the troubleshooter, and the troubleshooter can indicate parts and suggest troubleshooting steps.

According to exemplary embodiments described herein, as in U.S. patent application Ser. No. 12/689,737 by Meunier et al., the device screen is detached from the device and according to one exemplary embodiment, a 3D representation of the device is rendered on the device screen according to the position and orientation of the screen relatively to the device.

In addition, according to exemplary aspects of this disclosure, two viewpoints are available to the troubleshooter:

(1) the troubleshooter's view of the 3D representation of the device and (2) a virtual representation of the device as it is displayed to the end-user, for example a 2D, 3D or other view.

Because the position of the screen is detectable, the screen can act as an "end-user sensor" so as to inform the troubleshooter of the most probable position of the end-user relative to the device. According to one exemplary embodiment, a coarse grain positioning model is used, such as the one described in U.S. Patent Application Publication No. 2010/0125759 to Roulland, entitled "SYSTEM AND METHOD FOR LOCATING AN OPERATOR IN A REMOTE TROUBLESHOOTING CONTEXT," published May 20, 2010.

Differing from what is disclosed in U.S. patent application Ser. No. 12/689,737 by Meunier et al., the screen orientation is not exploited by default. So, according to one exemplary embodiment, unless specific end-user action is taken as described below, the virtual representation displayed to the end-user changes only upon important moves of the screen, for example but not limited to 50 cm. Also, the virtual representation does not necessarily change upon changes of orientation. In addition, the system can be configured such that placing the screen on the floor will not change the view angle. In this way, both the end-user and troubleshooter share a common understanding of the situation.

According to other aspects of the disclosed exemplary embodiments, and similarly to what is disclosed in U.S. patent application Ser. No. 12/689,737 by Meunier et al., the screen can act as a virtual video camera under the end-user' control. Following a camera metaphor, a still view taking into account both position and orientation can then be taken by the end-user, which can become a shared view with the troubleshooter.

Any still view can be used by the troubleshooter to indicate particular areas of the device to the end user, for example in 2D or 3D mode, possibly with 3D animations. In addition, the mobile screen can be equipped with a pointing device, enabling the end-user to point at parts, areas, etc. of the device for communicating to the troubleshooter.

Given a current status of the troubleshooting process and a device status, according to one exemplary embodiment, the troubleshooter controls the system to show instructions to the user needed to go from the current status to a desired status, and to be notified after the desired status is achieved.

Possible undesirable discrepancies between the device' actual and sensed status may become visible to the end-user, since the user is observing both the actual physical device and the virtual representation of the device, based on device' sensors input. The end-user can report over the phone any such discrepancy, possibly accelerating the troubleshooting session. For instance, the end-user may close a drawer and not observe the same happening in the virtual representation.

The following is a nonexclusive list of features associated with exemplary embodiment of a collaborative troubleshooting system according to this disclosure. The end-user client displayed on the detachable screen includes an additional "camera/freeze" button.

Figure 2:
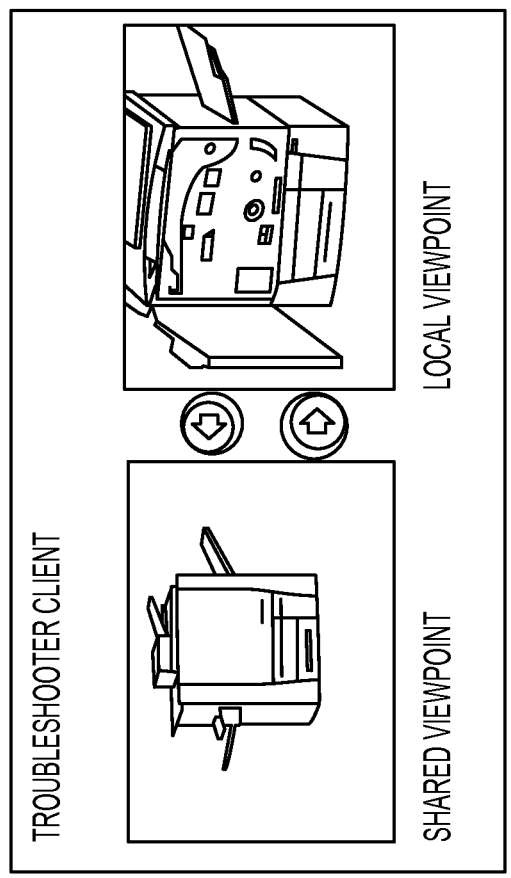
FIG. 2 illustrates exemplary end-user and troubleshooter interfaces according to this disclosure.
Figure 2:
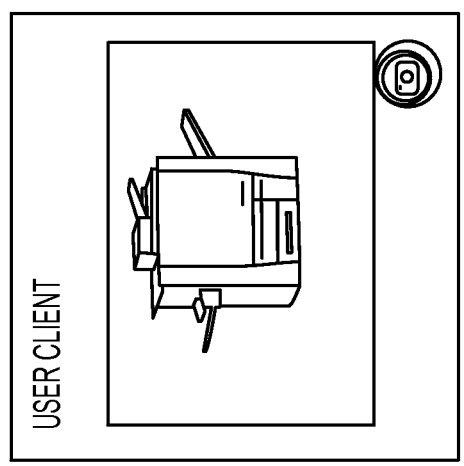

Two viewpoints are available to the troubleshooter as shown in FIG. 2.

A Shared Viewpoint: a 3D virtual representation of the device is generated and shared between the end-user and troubleshooter, and synchronized with the device status.

Local Troubleshooter Viewpoint: a troubleshooter configured representation of the device can be synchronized or disconnected from the device status and the end-user viewpoint, i.e., the shared viewpoint.

Using the so defined clients, i.e., the shared viewpoint and local viewpoint, the end-user and the troubleshooter collaborate in a troubleshooting session according to the following interaction modes.

The 3D shared representation, visible both in the end-user's client and in the troubleshooter's client, can work according to three different modes of interaction:

Live: The shared representation is updated according to the position of the end-user around the device taking into account only major changes in order to keep a relatively stable image.

Frozen: The shared representation is frozen on a viewpoint that has been defined by the end-user.

Guided: The shared representation includes the live mode with instructions overlaid in order to guide the end-user to locate a part and/or to perform an operation on the device such as described in U.S. patent application Ser. No. 12/689,737 by Meunier et al.

According to one exemplary embodiment, the Live mode is the default mode, i.e. a troubleshooting session starts in this mode and each time another mode is exited the system returns to the Live mode.

The local viewpoint available only to the troubleshooter enables only one mode of interaction which corresponds to a simulation mode where the troubleshooter navigates freely the virtual device and operate its parts.

From the above described viewpoints, i.e., shared and local representation, and the various modes, the participants are able to perform the following actions:

1) End-User Moves.

This is an implicit action available in the Live mode. By moving around the device with the detachable screen in the user's hands the end-user is modifying the viewpoint on the shared representation according to the end user's location around the device.

2) End-User Freezes the View.

From the Live mode, the end-user can press the camera/freeze button in order to transition to the frozen mode. Unpressing the button will freeze the shared representation to a viewpoint that was pointed with the detachable screen acting like a camera. In this case, the end-user can both control the orientation of the viewpoint and the zoom level according to how close the screen is from the device. A double press on the button or a large-enough move puts the screen back in the Live mode.

3) End-User Points a Part on the View.

When the system is in the frozen mode the end-user can touch the screen or use a pointing device in order to indicate one element on the frozen representation. Such frozen viewpoint can be stored by the troubleshooter for further uses. While we primarily consider using a virtual 3D model of the device, one extension consists in embedding a real still camera inside the screen. In this case the frozen viewpoint can be enriched with a real picture.

4) Troubleshooter Updates the Shared Viewpoint with the Local Viewpoint.

The troubleshooter controls the system to synchronize the shared viewpoint with the troubleshooter's own local viewpoint. In this case, the shared view turns into the guided mode and provides instruction to the end-users in order to move to the appropriate viewpoint.

5) Troubleshooter Updates Local View with Shared Viewpoint.

When the shared view is live or frozen, the troubleshooter may want to reset its local viewpoint to the end-user one. In this case the local viewpoint is updated to the current shared viewpoint.

6) Troubleshooter Indicates a Next Step to be Performed.

This action is similar to updating the shared viewpoint with information associated with the local viewpoint, with the addition that the troubleshooter has modified the status of the virtual device on its local view. The system guides the end-user to reproduce this change on the actual device.

7) Troubleshooter Points a Part on the Shared View.

When the shared view is frozen, the troubleshooter can point to areas/parts to guide the end-user.

The end-user can check that the 3D representation corresponds to the current status of the device. Whenever this correspondence is broken, it is indicative that either a sensor is not working properly or, possibly a part not sensed is in an unexpected state. The end-user can report this state mismatch to the troubleshooter, who will find a fix, workaround, or possibly interrupt the remote troubleshooting session and send a technician.

As described hereto, the subject system comprises systems and methods for negotiating common barriers arising in the user-troubleshooter interaction when trying to solve a device problem. The device becomes the infrastructural mediator between the troubleshooting expert and the user to create a bi-directional shared virtual representation of the device which the user-troubleshooter can manipulate for making coordinated performed actions in order to troubleshoot a problem associated with the device. The user accesses technical support through the device and carries out independent or suggested interactions with the troubleshooter via an audio-visual communication channel. Most parties thus have an enablement to real-time understanding of the actions which are being actually performed on the device, and thereby providing a resource for overcoming the descriptive and spatial problems which commonly and currently affect troubleshooting scenarios. The shared representation allows technical support to better utilize the abilities of the remote user to carry out actions on the device.

The shared representation thus enhances the troubleshooter's understanding of the problem and it further aids the discovery of a solution. The subject system mediates between the troubleshooter and the user for enabling them to mutually arrive at a solution despite not having mutual access to the problem source, i.e., the device. Major benefits are achieved over audio-only interaction since most of the user-troubleshooter interaction involves work of a spatial nature; describing parts, delivering instructions, etc.

Described below with reference to FIGS. 3-15 are exemplary embodiments of the disclosed collaborative systems and methods.

Figure 3:
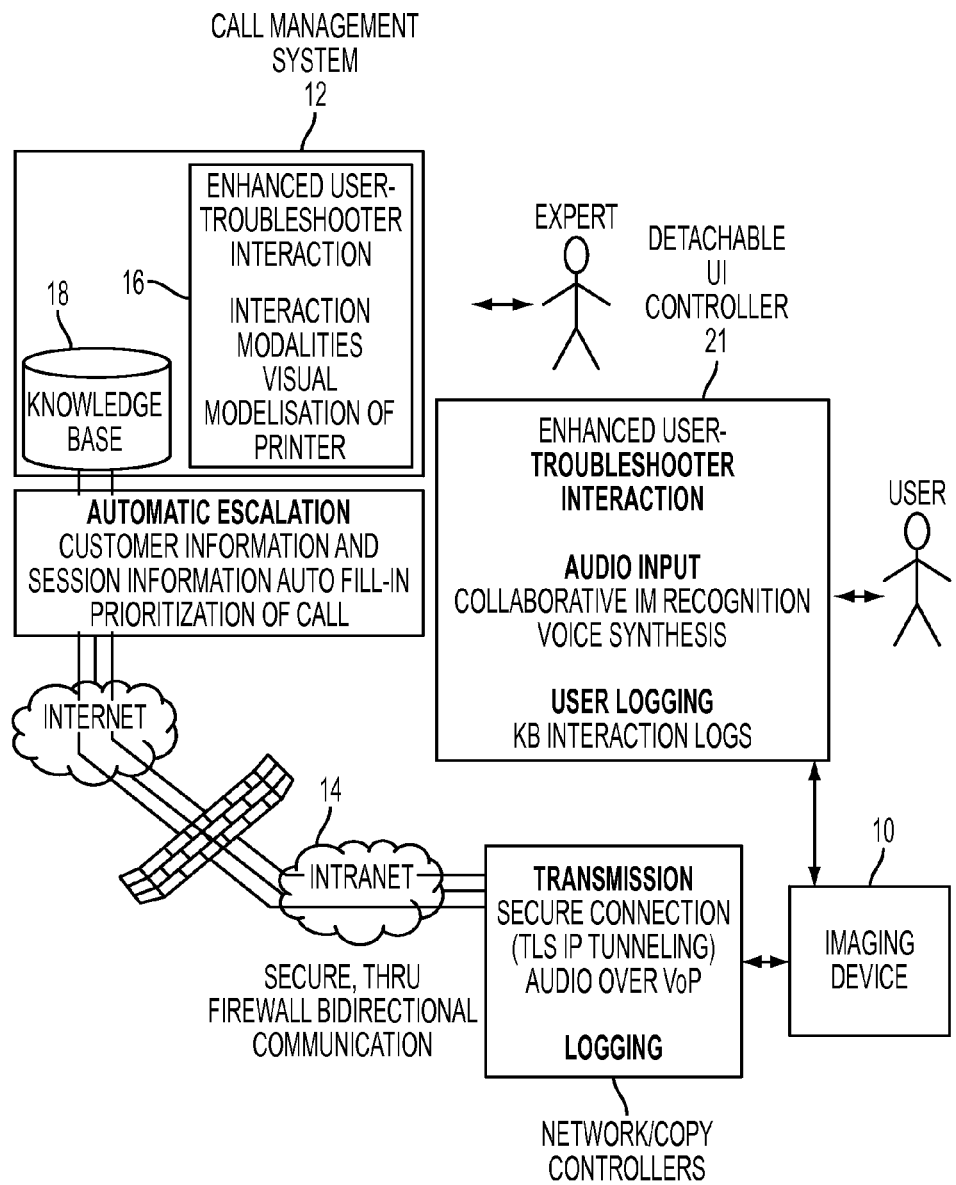
FIG. 3 is a general architecture of a bi-directional remote visualization system for supporting collaborative machine troubleshooting.

With reference to FIG. 3, an imaging device 10 (printer/copier, MFD) is connected to a service department/troubleshooter 12 via communication link 14 comprising a conventional firewall/intranet/internet link. The troubleshooter 12 includes a call management system 16 and knowledge base 18 comprising a database including customer information and call support information, and more particularly includes in knowledge base 18 stored data identification of the device 10 and a model of its expected visual representation as would be viewed by a user if servicing the device. A user has access to enhanced user-troubleshooter interaction through audio input/output and a visual imaging device 21 for display of the shared representation as hereinafter will be more fully detailed.

Figure 4:
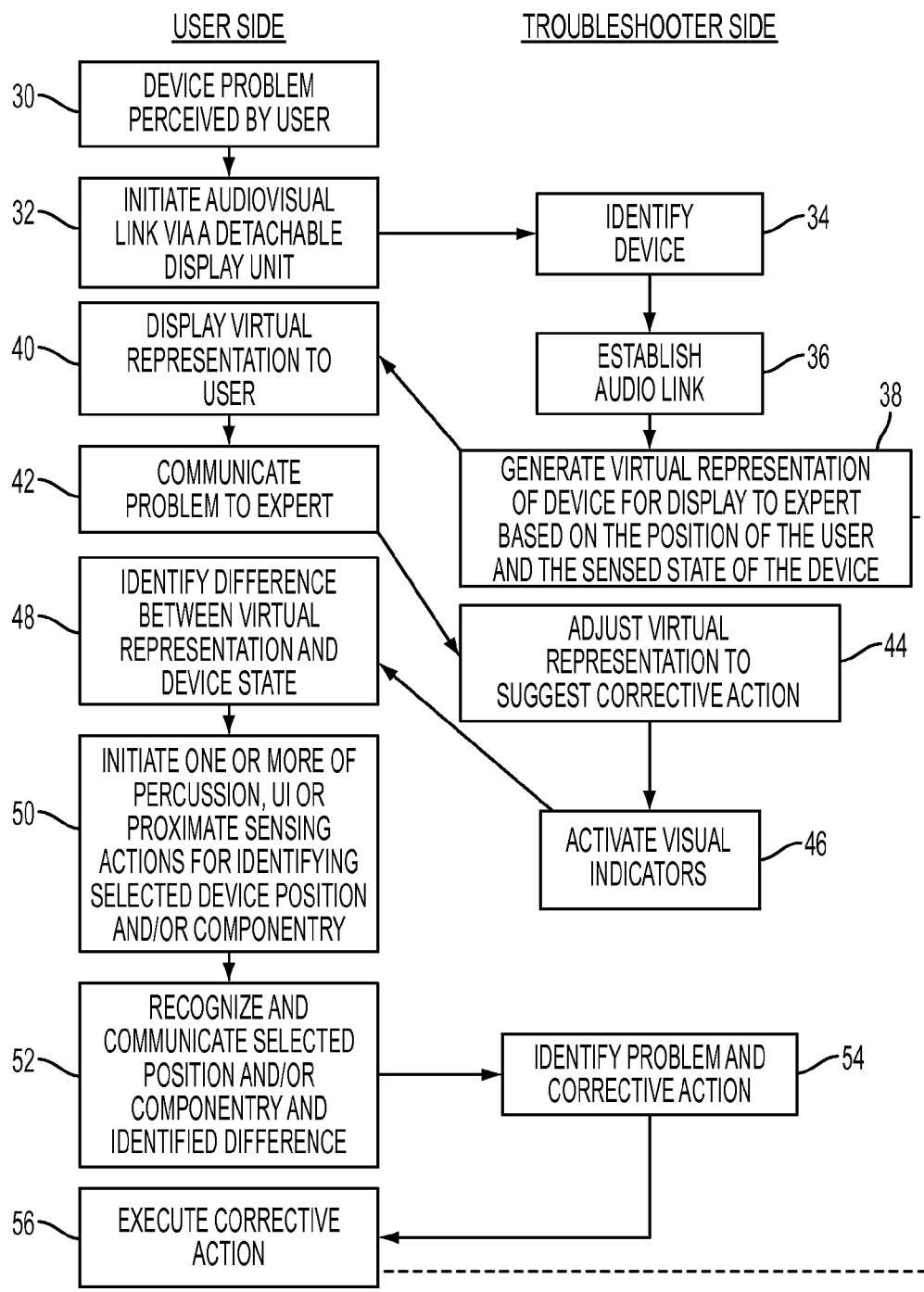
FIG. 4 is a flowchart showing the essential steps performed by a machine user and a troubleshooting expert in accordance with the subject system.

With reference to FIG. 4, the subject troubleshooting scenario is initiated when the user discovers 30 a problem with the device that they cannot troubleshoot or fix, or do not want to fix themselves. Such a problem may be software or hardware in nature, but for the following exemplary description will be as discussed as only hardware. A call is placed 32 to a remote support center and troubleshooter 12 by selecting a "call support" button on the user interface ("UI") of the device 10 display. Alternatively, when the device 10 detects a problem it is so indicated to the user who is advised via the UI that they should call support. The audio-visual link comprises a secure audio end-to-end connection to the customer support center server via a secured data connection through which relevant data is transmitted. The relevant data may include any or all of the following:

device serial number;
user ID, if the user is logged in, e.g. name and any other relevant information;
device diagnostic data, such as sensor information on the current state of the device;
historical information on the device events, e.g. toner changed; and
interaction data, e.g. user interaction with troubleshooting tools such as a knowledge base.

The troubleshooting remote server uses the relevant data in combination with its own stored data for identifying 34 the device and records of other troubleshooting sessions to build an initial device representation. The user is then asked to put on a headset for establishing 36 the audio link after the placing of a service call. Alternatively, when the secure audio connection is made and an operator comes on line, this may instigate the audio and visual signal, e.g. a phone style ring and a "put on your headset" message. The initial device representation is generated 38 and synchronously displayed 40 to both the user and the troubleshooting expert. The user oriented version of the device representation includes a visual representation of the current status of the device, e.g. showing which doors are opened, etc. The supplemental local representation of the device available to the troubleshooter includes some or all of the following information which may vary according to what was accessible and what is relevant to the current problem:

a) History of the device showing, if available, entries for:
field engineers intervention session, including, e.g. replacement of pieces;
previous collaborative troubleshooting sessions;
previous user troubleshooting sessions;
maintenance sessions, including, e.g. replacement of consumables; alerts, e.g. paper jam;
normal interactions, e.g. opened tray 1.
The history could be represented:
(1) simply as an unstructured or structured list (e.g. a tree) or
(2) as a state diagram, where nodes represent status of the device, or
(3) by an animation showing the physical changes in the status of the device. The troubleshooter can navigate the entries in the history for seeing more details, discovering actions performed by the user on the device before calling the service or similar problems already occurred.
b) Current status of the device including:
1. a visual description of the device (by a virtual model or images) as the user currently sees it. In addition, this representation could be enhanced with a view from different spatial perspectives (front-side, left-side, right-side, back-side) to facilitate at-a-glance recognition of problems;
2. other potential options such as:
  i. a sample of an image quality problem;
  ii. a sample of noises the device is producing;
  iii. a sample of abnormal vibrations.
c) Position of the user with respect to the device, displayed with the visual representation of the device and the spatial perspectives.
d) Means with which to interact through the collaborative system.

After the collaborative interface is established, the user can perform actions on the device and is provided with an imaging interface on a mobile display showing the current status of the interaction. Thus, the collaborative system comprises a bi-directional visualization of a shared virtual representation between the user of the device and the advising troubleshooter.

During the troubleshooting process, the troubleshooter 12 can give the user instructions on what to do to perform specific troubleshooting operations, e.g. removing parts of the device, etc. The troubleshooter is provided with a UI (user interface) showing:
a main interactive window showing the current status of the device as resulting from the interaction, including current sensed actions (e.g. an opened tray); the history of the device; if known, the position of the user; and a virtual representation of the device shared with the troubleshooter.
control buttons in the window showing actions of the user are also provided.

In order to communicate 42 the device problem to the troubleshooting expert, the user usually needs to indicate a part of the device. Such indication is effected by using the mobile UI to transmit and identify a signal, e.g. a cursor can indicate the part both on a main window of the UI display and on the window showing the actions of the user. Also, the user can indicate a part of the device by percussing it, e.g. tapping on that part, and/or coming into relatively close proximity to it, e.g., entering a field associated with a contactless sensor. Additionally, the user can perform an action on the device. The information on the action performed by the user is transmitted to the troubleshooter and the troubleshooter sees the results of the user action both on the shared virtual representation of the device and the local device representation available only to the troubleshooter. Such actions, along with the audio conversation effectively communicate 42 the device problem to the expert.

In response to the user actions, the expert on the troubleshooting side can also indicate a part of the device represented on the shared virtual representation by controlling the user display for the ultimate purpose of suggesting the corrective action to solve the problem. An identified part is remotely shown to the user on the device mobile display and, alternatively, visual indicators, e.g. LEDs, if available, facilitate part identification. The LEDs on the device part are activated as a special assist to a particular position to the user. After such indication, the expert will then select an action that the user should perform on the device or that part which can be represented on the shared virtual representation of the device.

The troubleshooter selects a part and then chooses the appropriate action, e.g. pushing, pulling, rotating or combination, from a menu of available options and the amount of force to be used. Such action is shown to the user on the mobile display and the visual indicators for the selected part are activated. When indicating the amount of force to be used on the part, different brightness intensity will indicate to the user the appropriate strength required for performing correctly the action. Also, the sense of the movement can be indicated in a sequence of activations of the visual indicators. A possibility for specifying an action for the troubleshooter could be select actions from a mnemonic resource and drag-and-drop them on to the presentation of the device in a main window displayed on the mobile UI.

Alternatively, the expert can put the user on hold so that the troubleshooter will be temporarily disconnected from the user for the purpose, for example, of making some tests without sharing them with the user. In this situation, on the user side, the mobile UI will show a message notifying the user of the holding status. By "hold" is meant a muting activity where the term "hold" serves to preserve the existing telephone metaphor used by call center troubleshooters.

An important aspect of the subject system is that the user can compare the actual state of the device with the shared virtual device representation to identify 48 any difference between what the expert indicates as the correct device state and the actual state seen by the user. For example, if the shared virtual device representation shows a particular latch as correctly being in position, and the user by the comparison can see that the latch is not in the indicated position, the mispositioning of the latch may be the source of the problem and its movement to the correct position may be the desired corrective action sought by the user. In communicating the particular positioning of the subject componentry, the user may again initiate 50 percussion and/or contactless actions for identifying selective device positions and/or the componentry. The system sensors within the device can recognize 52 and communicate through the communication link the selected position and/or componentry for clearly identifying the difference between the actual device state and the device state being considered by the expert. The problem and differences are then identified 54 to the expert who can then clearly indicate to the user the corrective action so that the user can then execute it 56.

It is to be appreciated that the foregoing example is provided for explanatory purposes and is not limiting. For instance, it is to be understood that there can be one or more communications for expressing problem and/or one or more communications for suggesting an action to resolve the problem. For example, after executing a corrective action 56, one or more other shared virtual representations of the device can be generated 38 and synchronously displayed 40 to both the user and the troubleshooting expert.

Figure 5:
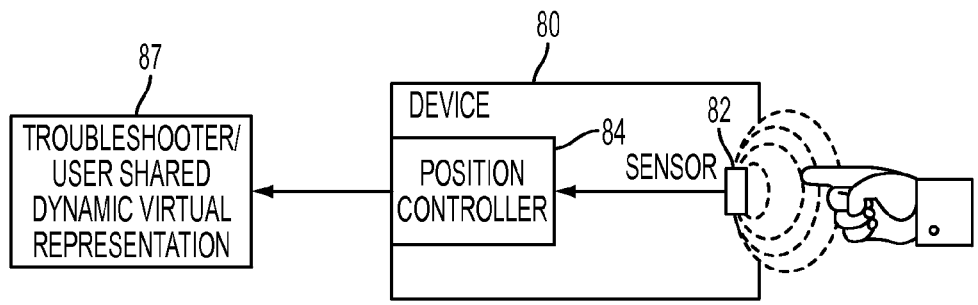
FIGS. 5-7 are block diagrams particularly illustrating selected components of an imaging system incorporating the present development.
Figure 6:
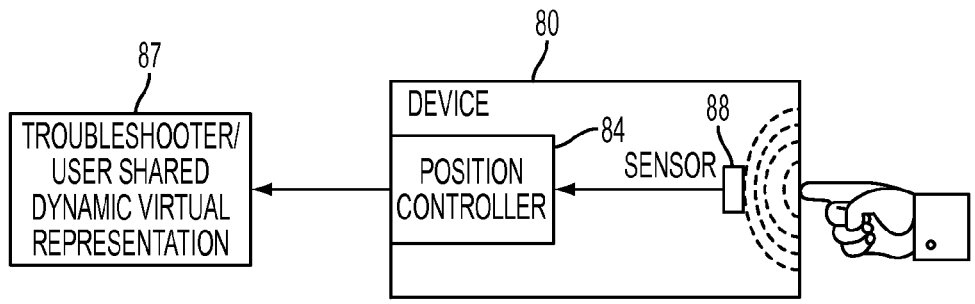
Figure 7:
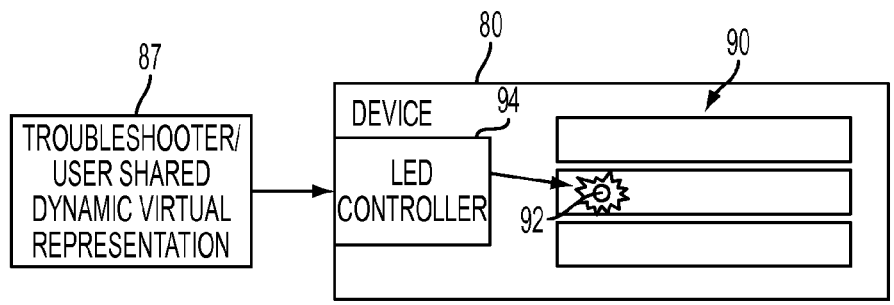

With reference to FIGS. 5, 6 and 7, exemplary devices comprising the subject system are shown. FIG. 5 illustrates a device 80 having a contactless sensor 82, e.g., a contactless capacitive sensor, which is capable of contactless detection of human proximity for identifying a component of the device 80. As described in detail above, in order to communicate the problem to the troubleshooting expert, the user usually identifies a part of the device to the expert. The user can indicate the part of the device 80 by disturbing the field generated by the contactless sensor 82, e.g. by penetrating the field with a hand or finger, as depicted. The information is conveyed to the troubleshooter via a position controller 84, and the troubleshooter can visualize the results on the shared virtual device representation 87, as described in detail above. The results and any audio conversation effectively communicate the problem to the expert.

FIG. 6 illustrates the device 80 having a percussion sensor 88 for identifying a user selected component of the device 80. The user can indicate a part of the device 80 by percussing, or tapping on it. Likewise, the information is conveyed to the troubleshooter via a position controller 84 who visualizes the results on the mobile UI 87, and the results and any audio conversation effectively communicate the problem to the expert.

FIG. 7 illustrates visual indicator positioning to better identify device or componentry positioning. In response to the user actions detected by the contactless and percussion sensors described in FIGS. 5 and 6, the expert on the troubleshooting side can indicate a part of the device 80 via the mobile UI 87 for suggesting a corrective action to solve the problem. An identified part is remotely shown to the user on a display 90 through various visual indicators 92 such as one or more illumination elements. As depicted, a LED controller 94 can be used to illuminate one or more of the visual indicators 92. The expert can then select an action that the user should perform on the device 80 or the identified part component of the device 80. This action is provided to the user, and the visual indicators 90 for the selected component are activated.

The protocols described above for the subject collaborative troubleshooting are merely exemplary and can be reordered in a sequence that the user and expert may determine to further enhance the efficiency of the communication process.

Now is described a detachable display unit for a device configured for displaying the shared virtual representation described above, e.g., a shared three-dimensional (3D) virtual representation of the device, for example, an MFD. The shared virtual representation assists a user by displaying a shared virtual representation of the device and guiding the user to perform actions on user-actuable components of the device, generally to resolve a problem with the device, such as a component malfunction, a need for replenishment or replacement of consumables, such as paper, ink or toner, to remove a paper blockage in the paper path network, adjust settings, and so forth. In normal operation, the UI display is seated on the device and functions as a conventional device display, assisting a user in performing device functions, such as printing, copying, and the like.

While the exemplary mobile UI (i.e., Detachable Display Unit) apparatus and method associated with the disclosed collaborative system is described in terms of an image rendering multifunction device with printing, scanning, and/or other functions or the like, it is to be appreciated that the system and method are equally applicable to other complex devices, specifically electromechanical devices, with which a user may encounter problems that are not readily solved using the user's general experience of the machine.

Figure 8:
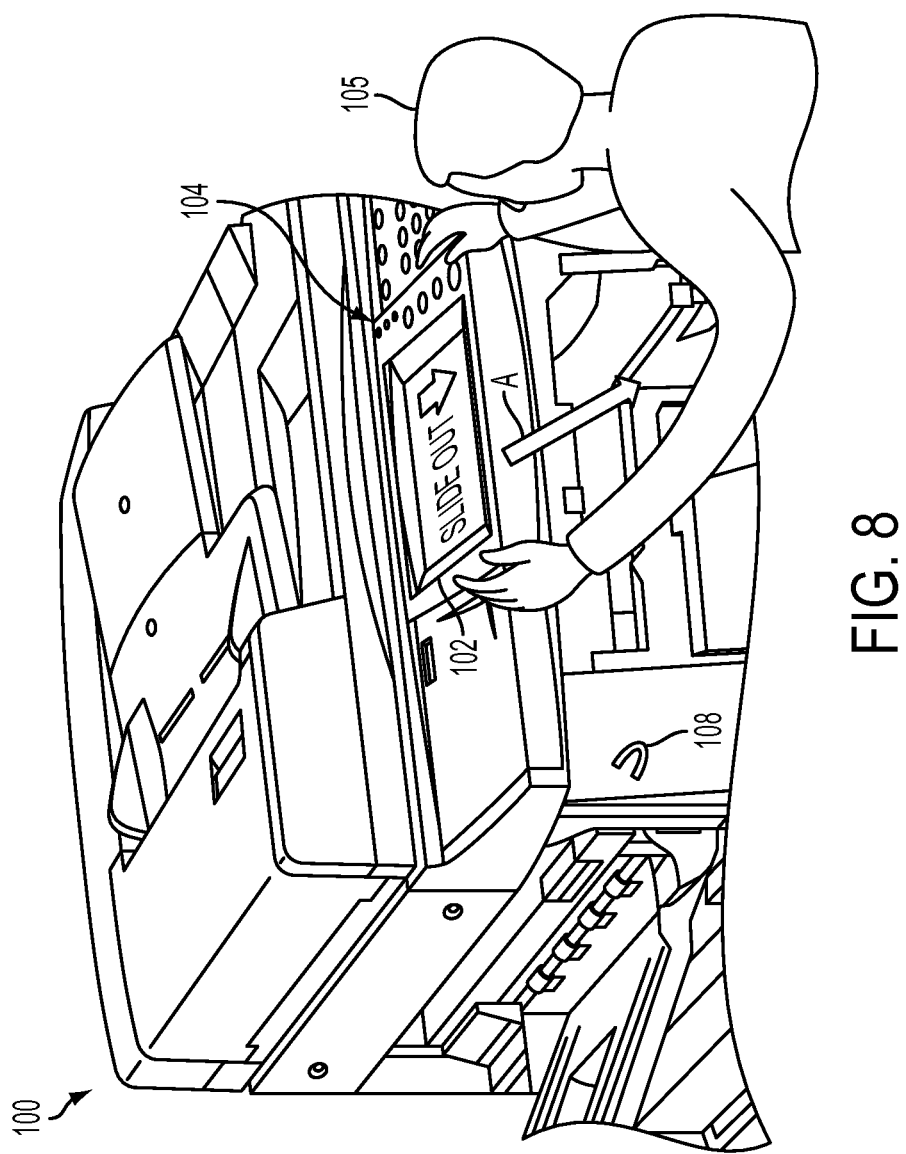
FIG. 8 is a perspective view of a multifunction device (MFD) which incorporates a detachable display unit docked on the MFD.
Figure 9:
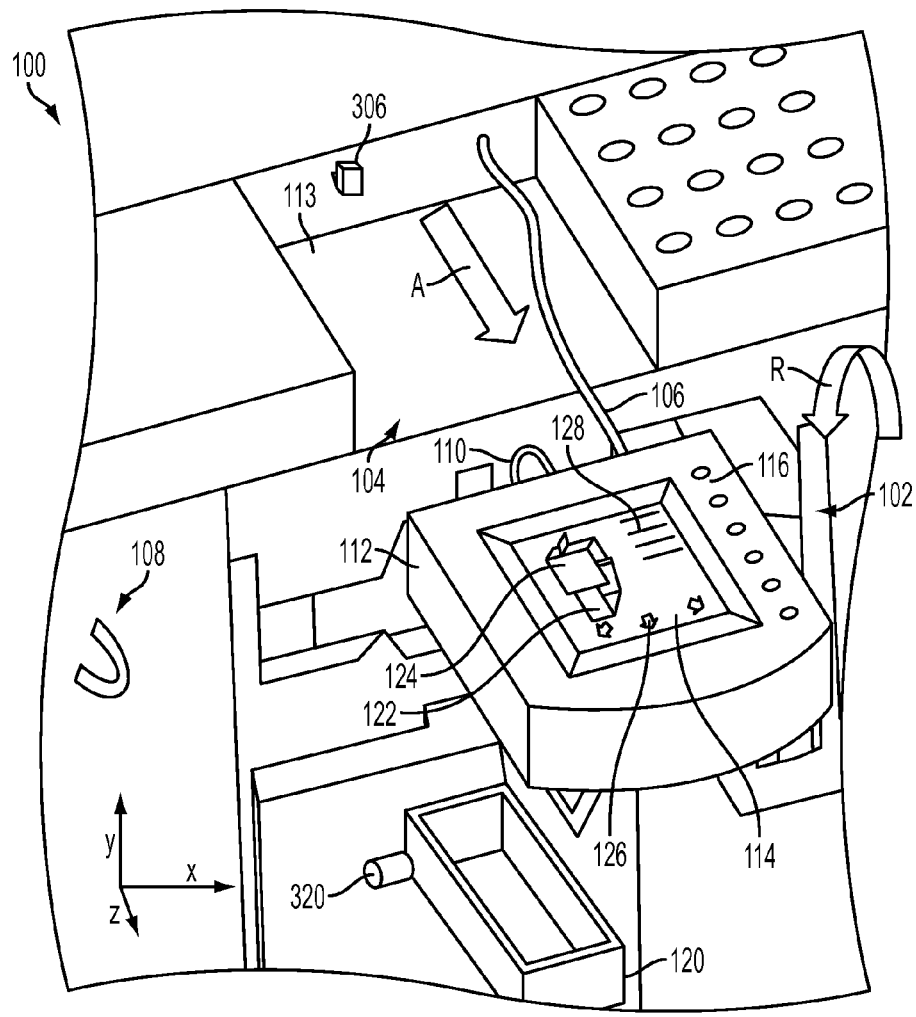
FIG. 9 is a perspective view of the MFD with the detachable display unit undocked displaying dynamic 3D virtual representations.

FIG. 8 illustrates an exemplary multifunctional device (MFD) 100 that includes a detachable display unit 102. The display unit 102 can be utilized by a user to facilitate troubleshooting a malfunctioning component. The display unit 102 can be utilized proximate to the MFD 100 during a troubleshooting session. FIG. 8 shows the display unit 102 in a docking position, in which it is removably mounted to an upper surface of the MED. The display unit 102 can be detached from a docking assembly 104 of the MFD by a user 105 and moved to a current position, spaced from the docking assembly, as shown in FIG. 9. The display unit can be held by the user in this position, such that the user can generate and share a dynamic 3D virtual representation of an appropriate component of the MFD 100 with a troubleshooter, while simultaneously performing a user action, e.g., repairing a malfunctioning component and providing a shared virtual representation of the device, from the users perspective, to the troubleshooter. In one embodiment, the MFD 100 provides a wired communication link 106 to the display unit. However, the MFD 100 can utilize known wired and/or wireless protocols to facilitate communication of data between the MFD 100 and the display unit 102.

The display unit 102 can be removed from the docking assembly 104, for example, by pulling it forward in the direction of arrow A to a position spaced from the docking position. From there, it can be moved in three dimensions, illustrated by arrows x, y, z (e.g., up, down, sideways, forward and back) and reoriented, e.g., tilted from the horizontal orientation of the docking position to an orientation closer to vertical, as illustrated by arrow R, making the screen more easily seen by a user positioned in front of the MFD.

As illustrated in FIG. 9, when removed from the docking assembly 104, the display unit 102 can be temporarily mounted in a second position using a mounting member, such as a hook 108, e.g., located on a panel on the MFD. For this purpose, the unit has a corresponding mounting member 110, here shown as a loop.

Users of MFDs often encounter problems that can be easily remedied when provided with appropriate visualization of the component and procedures, in particular internal components not easily viewed by the user. In order to expedite solution of such problems, the display unit 102 provides the user and troubleshooter with the dynamic 3D virtual representation of the MFD 100 while the user is acting on one or more of the MFD components. The 3D virtual representation is rendered on the display unit 102 and communicated to the troubleshooter according to the current position and orientation of the detachable display unit, relative to the electromechanical device, thus providing a shared contextualized view of the 3D model rather than an image of the MFD.

With continuing reference to FIG. 9, the display unit 102 includes a housing 112, shaped to be received in a cradle 113 defined by the docking assembly 104. A display screen 114 is mounted to the housing 112. The display screen 114 may be a touch screen. Alternatively or additionally, a keypad 116 maybe be provided on the display unit, which includes user-actuable controls.

The MFD 100 includes various components upon which a user can perform user actions. As an example of a component, FIG. 9 shows a waste bin 120, which is also graphically visualized on the display screen 114 at 122 in a 3D virtual representation 124 of the user-actuable components of the device 100.

Figure 10:
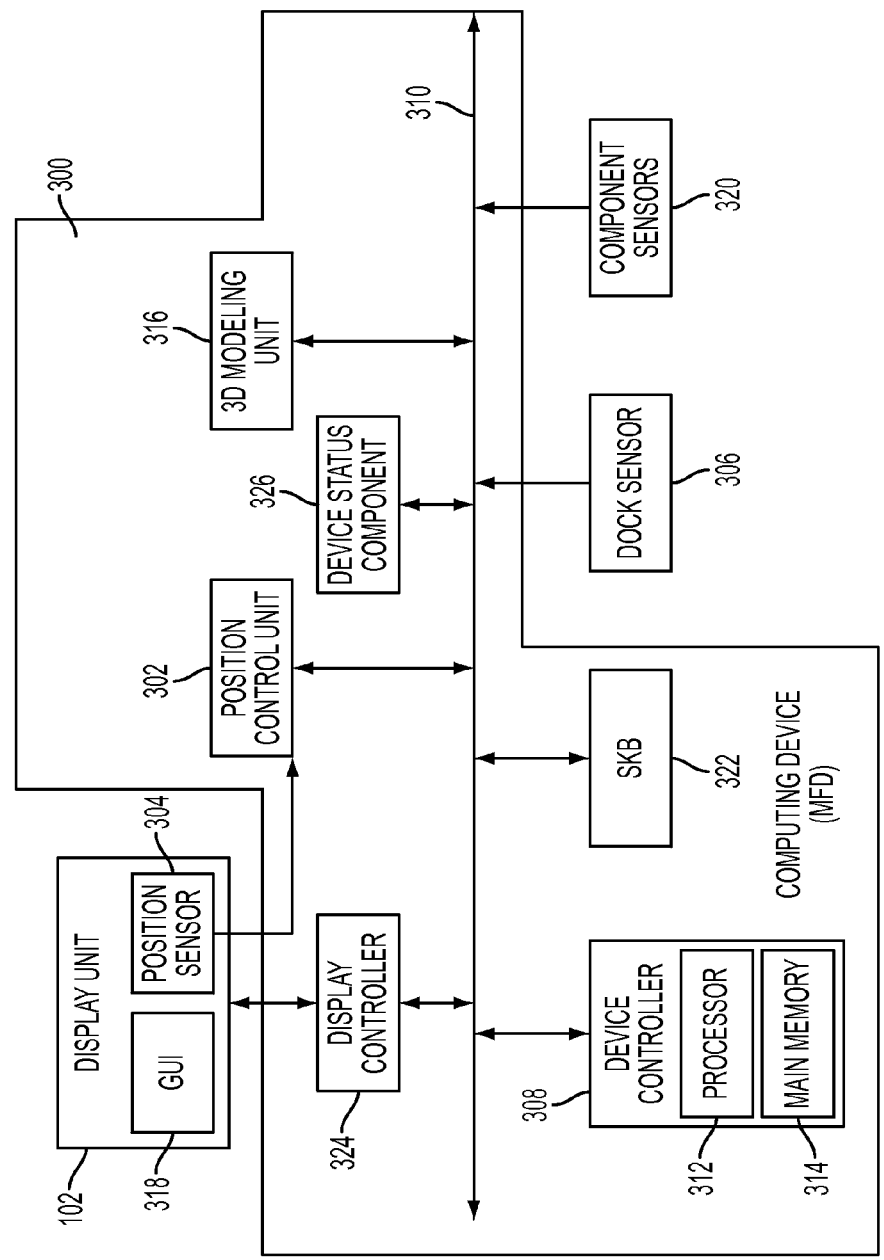
FIG. 10 is a functional block diagram of the multifunctional device and display system.

FIG. 10 illustrates an exemplary dynamic display system 300 which makes use of the detachable handheld display unit 102 in order to assist a user in troubleshooting an MFD 100 containing several components. The display system 300 includes a position control unit 302 that tracks the location and orientation of the display unit 102, relative to the MFD, in particular, relative to a stationary part of the MFD. While the position control unit 302 is shown as being resident on the MFD, it is also contemplated that the position control unit 302 may be resident on the display unit 102 and communicate position and orientation information to the MFD, e.g., via link 106. The display unit 102 includes a position sensor 304 which provides real-time position data to the position control unit 302. The position sensor 304 includes, for example, at least one three-axis accelerometer which measures acceleration vectors in three orthogonal directions. The position sensor 304 provides position information, such as the acceleration vectors, to the position control unit 302. The position control unit can determine the distance traveled relative to a base position, such as the position of the unit 102 in the docking cradle 113. In this manner, the position sensor location can be tracked to a specific location in space, and hence the display unit's position, relative to the MFD.

The display unit 102 is initialized to a base position, e.g., in the docking assembly 104, in order to establish a point of reference for movement therefrom. In order to establish a base position of the position sensor 304, the display unit 102 is placed in the docking assembly 104, which provides a predefined position relative to the position control unit 302. Once the base position is established, the position and orientation of the display unit 102 can be easily ascertained at substantially any frequency. A docking sensor 306 (FIG. 9) monitors whether the display unit 102 is attached to (seated in) or detached from the docking assembly 104. While docked, the base position of the display unit 102 is established and maintained. Once the display unit is removed from the dock to a first detached position, the docking sensor 306 detects its absence, which triggers the position control unit 302 to initiate tracking of the display unit 102.

The position control unit 302 interfaces to a device controller 308, e.g., over a system bus 310 and/or link 106. In this way, the position control unit 302 provides the location and orientation of the display unit 102. The docking sensor 306 also provides the device controller 308 with an initiation signal for tracking. The device controller 308 can utilize software to process the data received from the various components of the display system 300 via the system bus 310. In one embodiment, the device controller 308 supports the systems and methods described herein.

It is to be appreciated that any suitable computing device can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

In one embodiment, the device controller is hosted by a digital front end (DFE) operatively connected to the MFD 100. The device controller 308 can employ a digital processor 312 which executes instructions stored in computer memory 314. The system bus 310 may couple various system components including the system memory to the processor 312. The processor 312 can be variously embodied, such as by a single-core processor, a dual-core processor (or more generally by a multiple-core processor), a digital processor and cooperating math coprocessor, a digital controller, or the like.

The system bus 310 can be any of several types of bus structure including a memory bus or memory controller, a peripheral bus, and a local bus using any of a variety of commercially available bus architectures.

The memory 314 may include read only memory (ROM) and random access memory (RAM). The memory 314 can further include at least some form of computer readable media such as a hard disk drive, a magnetic disk drive, e.g., to read from or write to a removable disk, and an optical disk drive, e.g., for reading a CD-ROM disk or to read from or write to other optical media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the device controller 308.

Device controller 30 may also control the MFD 100, based on instructions stored in main memory 314.

A user may enter commands and information via a user input device, such as the keypad 116, touch screen 114, or other input devices not shown. The display screen 114 may be connected to the system bus 310 via an interface, such as a video adapter (not shown).

The user and troubleshooter are assisted by being provided with a dynamic 3D virtual representation 124 of at least a part of the MFD 100 in which a representation 122 of a malfunctioning component is highlighted or otherwise identified, e.g. by a tag 315 which provides the name of the part and optionally other information. The display system, or alternatively a remote troubleshooting client, includes a 3D modeling unit 316, which generates the dynamic shared 3D representation of the MFD 100 and its components. The 3D virtual representation 124 includes at least the parts of the MFD 100 that will be visible or actionable by the user in the context of the repair; other parts may be omitted from the representation. Such a representation 124 may include paper storage trays, access doors, moveable levers and baffles for accessing jammed sheets in the paper path, marking media replaceable containers, such as toner cartridges or ink containers, waste toner receptacles, other replaceable items, such a photoreceptors belts and fuser roll heaters, finisher components, such as collection trays, stapling devices, and the like. As well as visualizing these components 120, the 3D virtual representation visualizes appropriate user actions, such as opening doors, turning levers, lifting baffles and so forth which may be used to access and/or repair a component. See, for example U.S. patent application Ser. No. 12/396,506 and U.S. Patent Publication No. 2006/0197973A1, incorporated by reference, which describe an exemplary 3D modeling unit and a method of linking the knowledge base with the 3D modeling unit 316. In particular, a links database (not shown) can be used to link problems and solutions extracted from the SKB 322 with the 3D model generated by the modeling unit 316, although in the present case, the 3D model also takes into account the position and orientation of the display unit, e.g., relative to the MFD.

The 3D modeling unit 316 can provide a view in three dimensions based on the determined position and orientation of the display unit 102 when handled by the user to give them a more realistic visual experience. For example, the display unit 102 mimics a viewfinder of a camera to guide the user to the malfunctioning component of the MFD 100. As the display unit 102 moves, the graphical representation 124 on the display changes accordingly. The 3D modeling unit 316 receives the relative position and orientation of the display unit 102 from the device controller 308 via the system bus 310. The dimensions of the MFD along with the dimensions and locations of the components are known, such that the position and orientation of the display unit 102 can relate to the specific location of the components. While the virtual representation is described as a 3D virtual representation, two dimensional representations of the MFD 100 are also contemplated.

The 3D virtual representation 124 is provided to the device controller 308 via the system bus 310 to be displayed via a graphical user interface (GUI) 318 of the display unit 102 which incorporates the screen 114 and user input device 116.

The GUI 318 allows users to receive instructions from a troubleshooter sharing the virtual representation of the MFA, and perform a series of actions such as changing device configurations, preferences, requesting that the MFD perform actions, such as copying, faxing, scanning, or the like in addition to troubleshooting the MFD 100. In the event of a malfunction, a component sensor 320 (FIG. 9), associated with the malfunctioning component 120 in question, signals to the device controller 308 via the system bus 310 that a malfunction is present. The device controller 308 communicates to the GUI 318 via the system bus 310 to report to the user that a problem is present.

A searchable knowledge base (SKB) 322 interfaces to the device controller 308 via the system bus 310 to provide textual information and instructions related to the component 120 to the GUI 318 in addition to information provided by the troubleshooter accessing the SKB or other databases. If the user is relatively familiar with the problem and/or the device 100, the user can follow the instructions provided to the GUI 318 without undocking the display unit 102. However, if the user is inexperienced with the reported malfunction the user can detach the display unit 102, which initiates the tracking and changes the display of the 3D virtual representation of the MFD 100.

Figure 11:
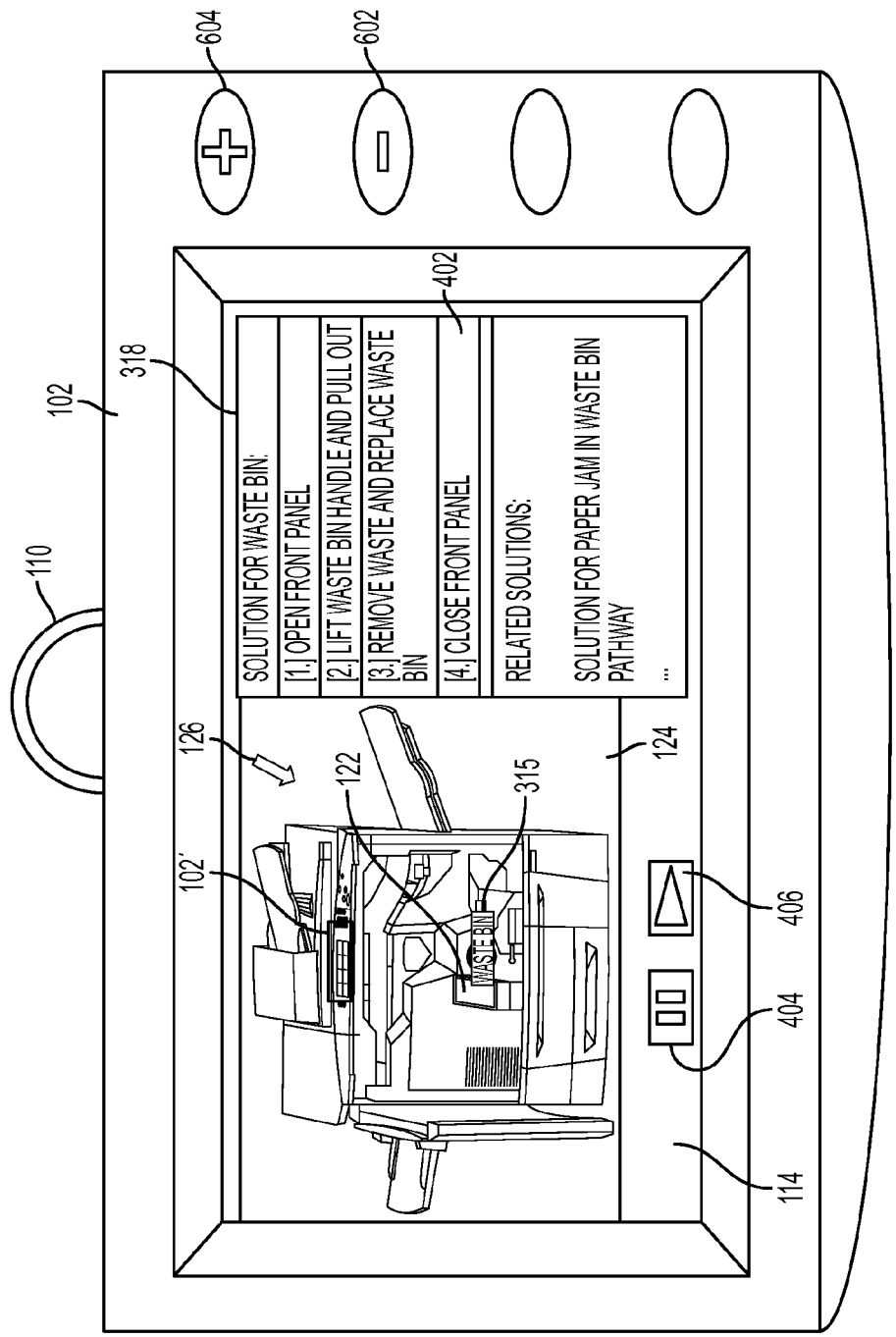
FIG. 11 is an enlarged perspective view of the detachable displaying unit illustrating one embodiment of the dynamic 3D virtual representation.

As illustrated in FIG. 11, the malfunctioning component representation 122 is highlighted along with visual indicators 126, such as arrows, for guiding the user to the location of the highlighted component. In addition to the virtual representation 124 and visual indicators 126, the GUI 318 can display textual information 318, such as instructions 402, adjacent to the device model 124. The textual instructions are retrieved from the SKB 322 or troubleshooter by the controller 308. The instructions can be static. Or, they can be dynamic, e.g., based on the position and orientation of the display unit 102 or based on the performed user actions signaled by component sensors 320. By dynamic, it is meant that the textual instruction change in order, complexity, detail, or the like based on the position and orientation of the display unit 102 and/or user actions. For example, if the first instruction is "open the front panel" and a front panel sensor detects that the panel is open, as shown in FIG. 9, this instruction may be grayed out to indicate that this action has been performed.

The SKB 322 can be a structured electronic database of problem statements (cases) which may be a short textual description of a known problem linked to the malfunction component and a one or more solution statements which describe steps for resolving the problem. The solutions can each comprise a sequence of one for more steps for a user to perform in attempting to resolve the problem. A solution sequence may be composed of at least two parts: a title, which basically describes what needs to be done, and a description, which gives step by step instructions to the user to fix the problem. The problem statements may be stored as hypertext documents, such as extensible markup languages (XML) documents, which are annotated with tags, which link the problem statements to the associated solutions. While the SKB may be located in memory 314 of the MFD 100, in other embodiments, it is accessed remotely, e.g. via a network, such as the internet, or a local area network.

A device status component 326 receives feedback from the device 100 concerning its status, e.g., from component sensors 320 and communicates with the controller when a fault is detected. In the event that a user identifies a problem (or even when a problem is detected via a component sensor 320) one or more root causes may exist for the observed problem which may each include one or more solutions sequences. The SKB 322 may be indexed according to the content of the problem statements only, or both the problem statements and the solutions. In this manner, the user or troubleshooter can select a problem statement and then the user can detach the display unit 102 to attempt to resolve the problem by performing one of the linked solution sequences. Alternatively, the user can detach the display unit 102 prior to selecting a problem statement. The solutions can be ranked based on a determination by the status component 326 of the most likely cause(s) of the problem and their solutions.

FIG. 11 illustrates the detachable display unit 102 with the displayed GUI 318. The illustrated display unit 102 includes a display panel 114 that is responsive to touch. By touch sensitive, it is meant that the display panel 114 generates touch data responsive to a user's finger "touch", for example, through sensing pressure or local changes in an electrical property such as resistivity or capacitance changes, heat, light, or motion sensing which detects a user's finger when positioned in touching or close proximity to the panel 114. The generated touch data, e.g. electrical signals, allows an identification of the location of the finger touch on the panel for controlling operation of the device based therefrom.

The display screen 114 may be addressable by a display controller 324 (FIG. 9) via the communication link 106 (FIG. 9) which causes the display screen 114 to display the dynamic 3D virtual representation 124, textual information 318, and optionally other graphics, such as user selectable graphic objects, e.g. tabs, buttons 404, 406, and the like (FIG. 4). The touch data is communicated to the display controller 324 which adjusts the graphics in a predetermined manner, based on the contact area. In normal operation, information from the display controller 324 is communicated to the device controller 308 via the system bus 310, which uses this information to control the operation of the MFD 100. In the exemplary embodiment, the display screen 114 is an LCD display panel; however, OLED, plasma, SEC, CRT, or the like panels are also contemplated.

The position controller 302, 3D modeling unit 316, display controller 324 and device status component 326 may be implemented in hardware or software or a combination thereof. In one embodiment, those components are in the form of software instructions stored in memory, such as memory 314 or a separate memory, and executed by a processor, such as processor 312, or by a separate processor. While in the exemplary embodiment, each of these components is resident on the same computing device it is contemplated that one or more of them may be resident on a separate computing device and communicatively linked to the device controller 308.

With returning reference to FIG. 11, in a troubleshooting mode, the GUI 318 includes the dynamic 3D virtual representation 124 of the MFD 100 and the related textual information 318 retrieved from the SKB. In the illustrated embodiment, the information includes instructions 402 for resolving a problem. The GUI can also include a pause, freeze, or live function implemented as a soft button 404; however, assigning a physical, or hard, button is also contemplated. The pause function acts to maintain the current 3D virtual representation 124 regardless of changes in the display unit's 102 position or orientation. For example, the user may require both hands to perform a suggested user action. In this case, the user can pause the current 3D virtual representation and set the display unit 102 on the floor or onto a hook 108 or alternate cradle (FIG. 9). The hook 108 or alternate cradle may be located on an inside face of an access panel or at any number of locations which may facilitate the user in performing various user actions. Once the user action is completed, the user can pick up the display unit 102 and resume the dynamic model of the MFD 100 by touching the soft button 406 to active the play, or unfreeze, function. It should be noted the play and pause functions can alternatively utilize the same button.

As an example, the waste bin 120 of the MFD is sensed as being full and it is suggested that it be cleaned. For example, a component sensor 320 detects that the waste bin 122 is full and communicates sensing information to the device controller 308 indicative of a full state. The device controller 308 communicates with the GUI 318 and thereby reports to the user and troubleshooter the status of the waste bin 122. The GUI of the display unit 102 still attached, or docked, to the MFD displays a graphical representation 124 of a part of the MFD including a representation 122 of the waste bin together with textual instructions 402.

If the user is not familiar with the location of the waste bin 122, the user may detach the display unit 102 from the docking assembly 104, upon which the graphical representation 124 displaying the MFD becomes a position-responsive 3D model. Given a current position and orientation of the display unit with respect to the base position, e.g., the docking assembly 104, the GUI can render the 3D model adapted to the display unit position and orientation, as decided by the user. Visual indicators 126 can guide the user to position the display unit in close proximity to the actual waste bin 120 (highlighted on the screen) at which point further detailed textual instructions 402 regarding waste bin removal can be presented adjacent to the rendered 3D model 124.

Figure 12:
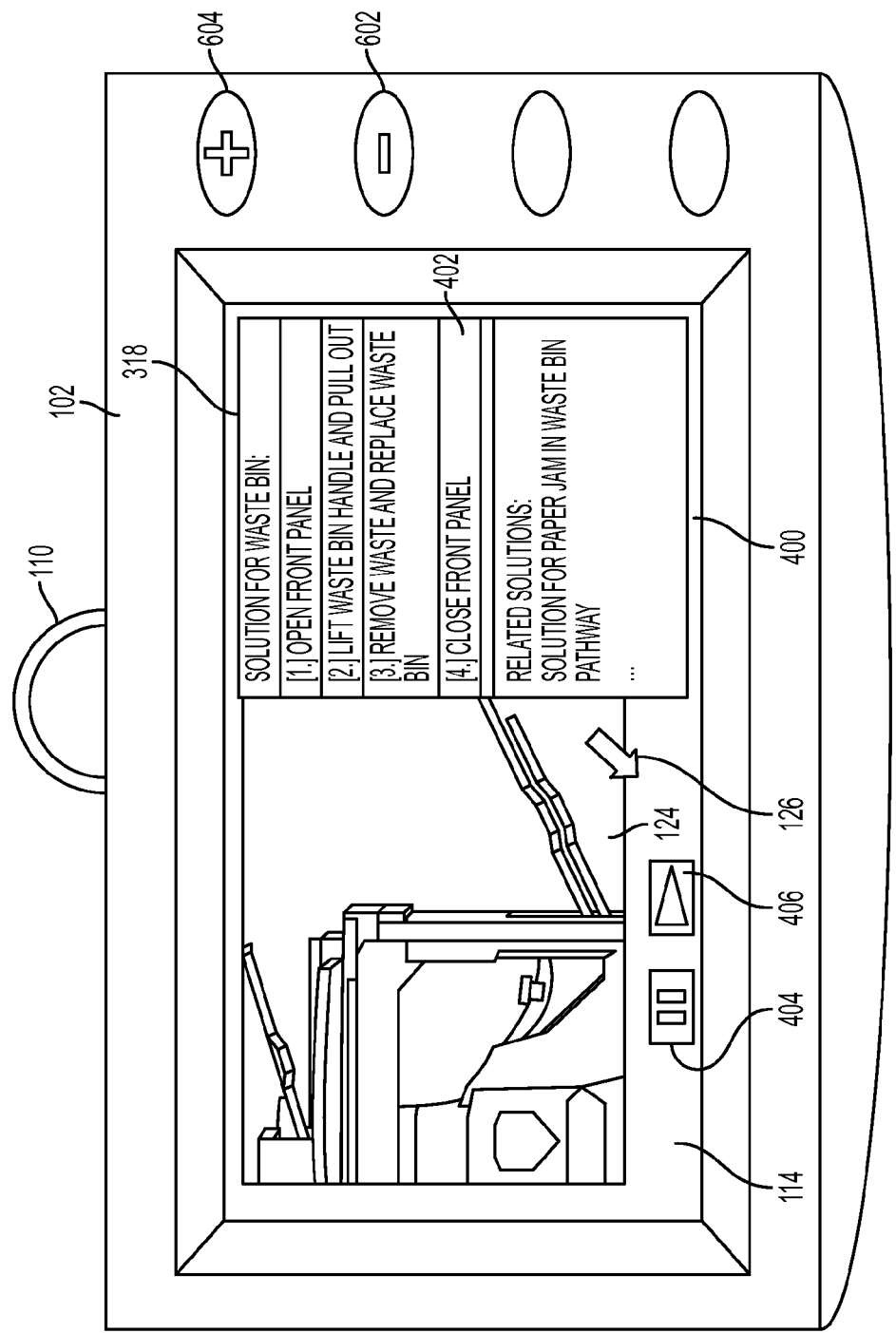
FIG. 12 is an enlarged perspective view of the detachable displaying unit illustrating another embodiment of the dynamic 3D virtual representation.

With reference to FIG. 12, as the user moves the display unit 102, given the current position and orientation, the 3D virtual representation provided to the user and troubleshooter 124 may represent a different component of the MFD 100, for example the input tray. A visual indicator 126 provided by the troubleshooter may be displayed to guide the user to move the display unit 102 towards the waste bin.

Figure 13:
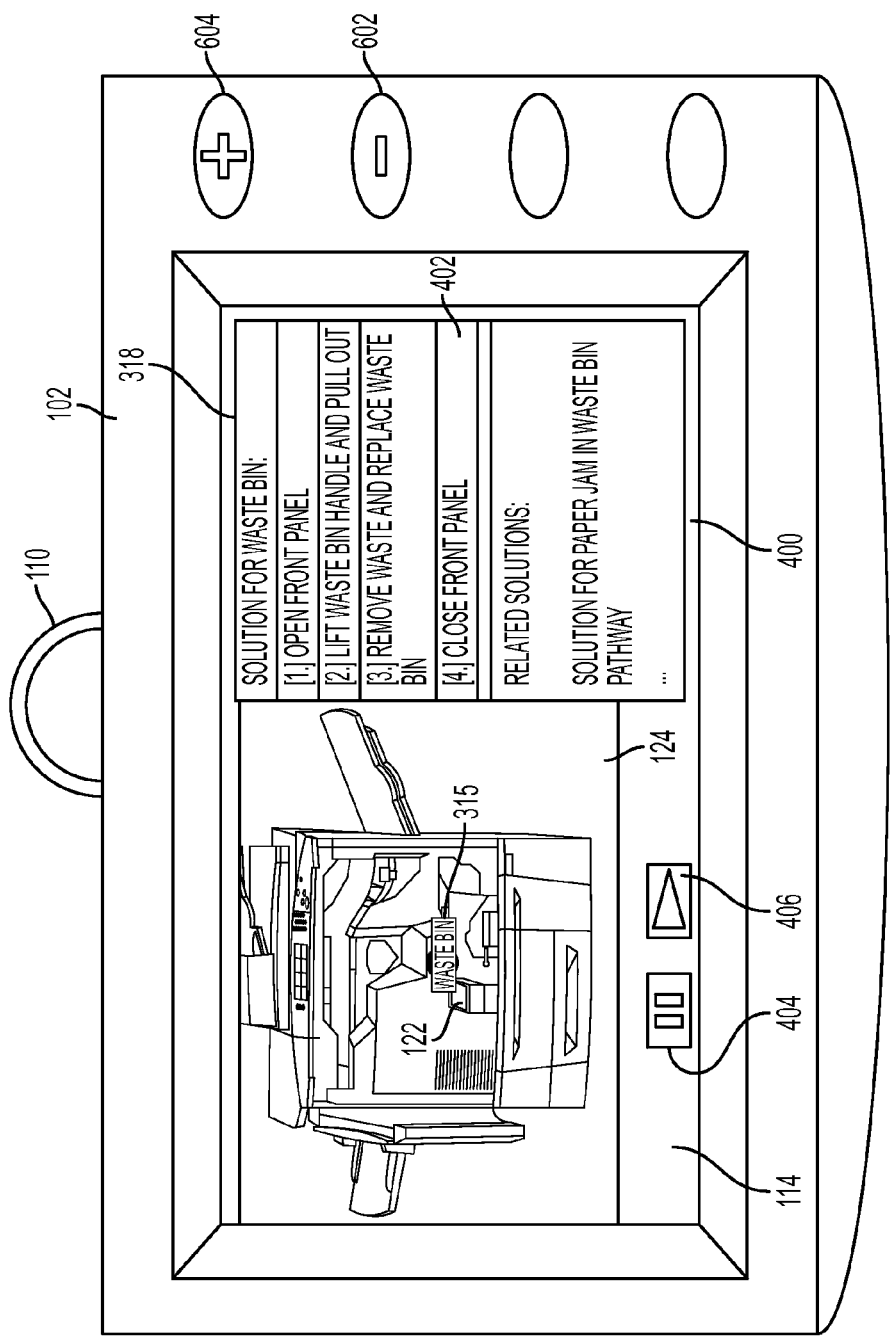
FIG. 13 is an enlarged perspective view of the detachable displaying unit illustrating another embodiment of the dynamic 3D virtual representation.
Figure 14:
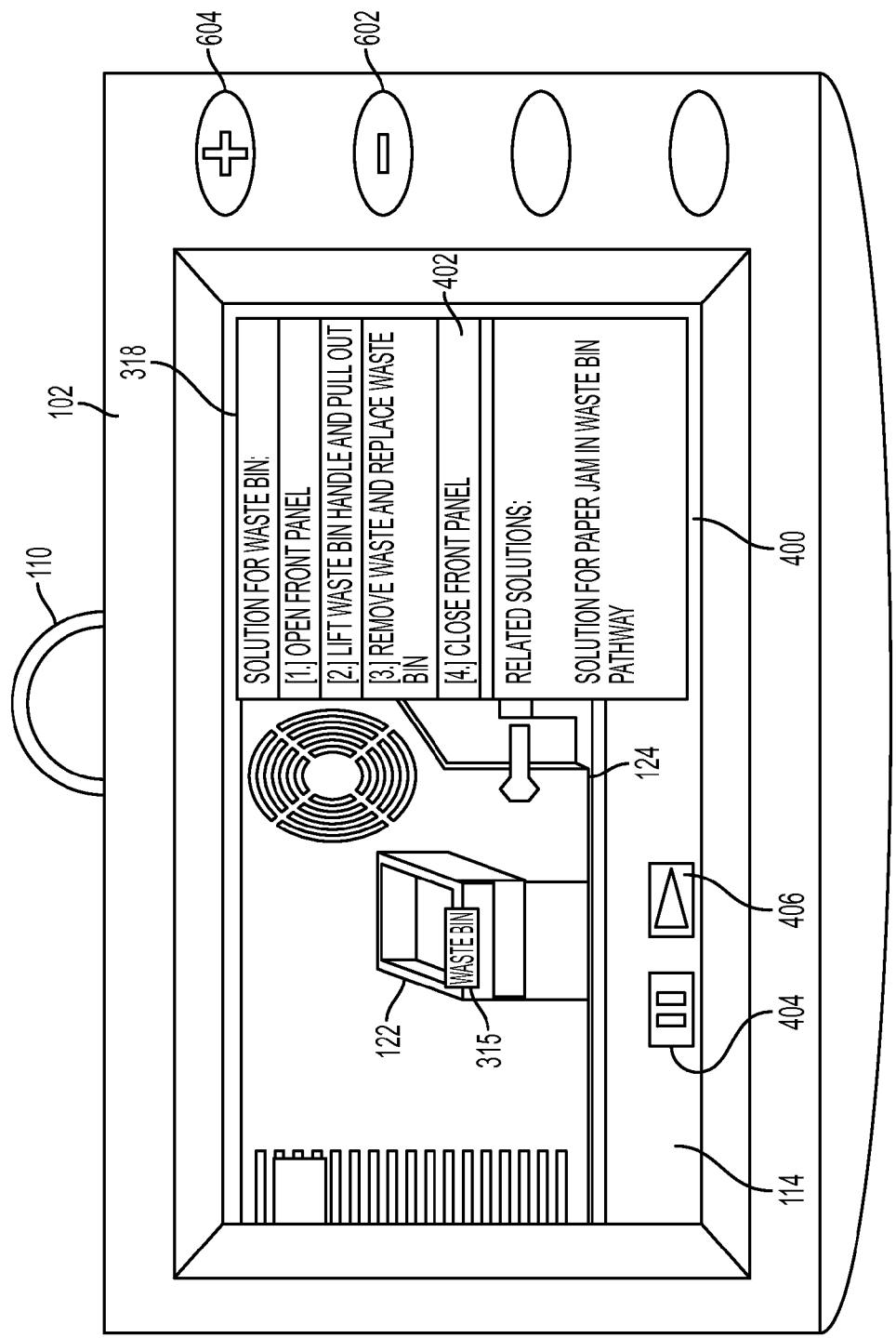
FIG. 14 is an enlarged perspective view of the detachable displaying unit illustrating another embodiment of the dynamic 3D virtual representation.

With reference to FIG. 13, in the case that the user still has difficulty locating the waste bin he/she can zoom out such that the 3D representation 124 may appear as illustrated in FIG. 14. The zoom in and out functions may be implemented as hard buttons 604 and 602, respectively; however, soft buttons integrated into the GUI 318 are also contemplated. In another embodiment, the user can step back from the MFD 100 while holding the display unit 102. The position control unit 302 determines that the display unit 102 is further away from the MFD 100, thus actuating zoom functions based on the position of the display unit 102.

In addition to illustrating an enlarged representation of the waste bin, FIG. 14 illustrates the 3D virtual representation 124 when the user has the display unit 102 physically proximate to the waste bin 122, at which point the user may pause the current 3D representation 124 and set the display unit down or place it on hook 108 or in alternate docking assembly. Once the user action is completed, the user replaces the display unit 102 into the docking assembly 104, at which point the docking sensor 306 triggers the termination of the dynamic 3D virtual representation 124 of the MFD 100 and any textual instructions regarding the resolved problem (assuming that the user has performed the actions specified and the problem has been resolved).

Figure 15:
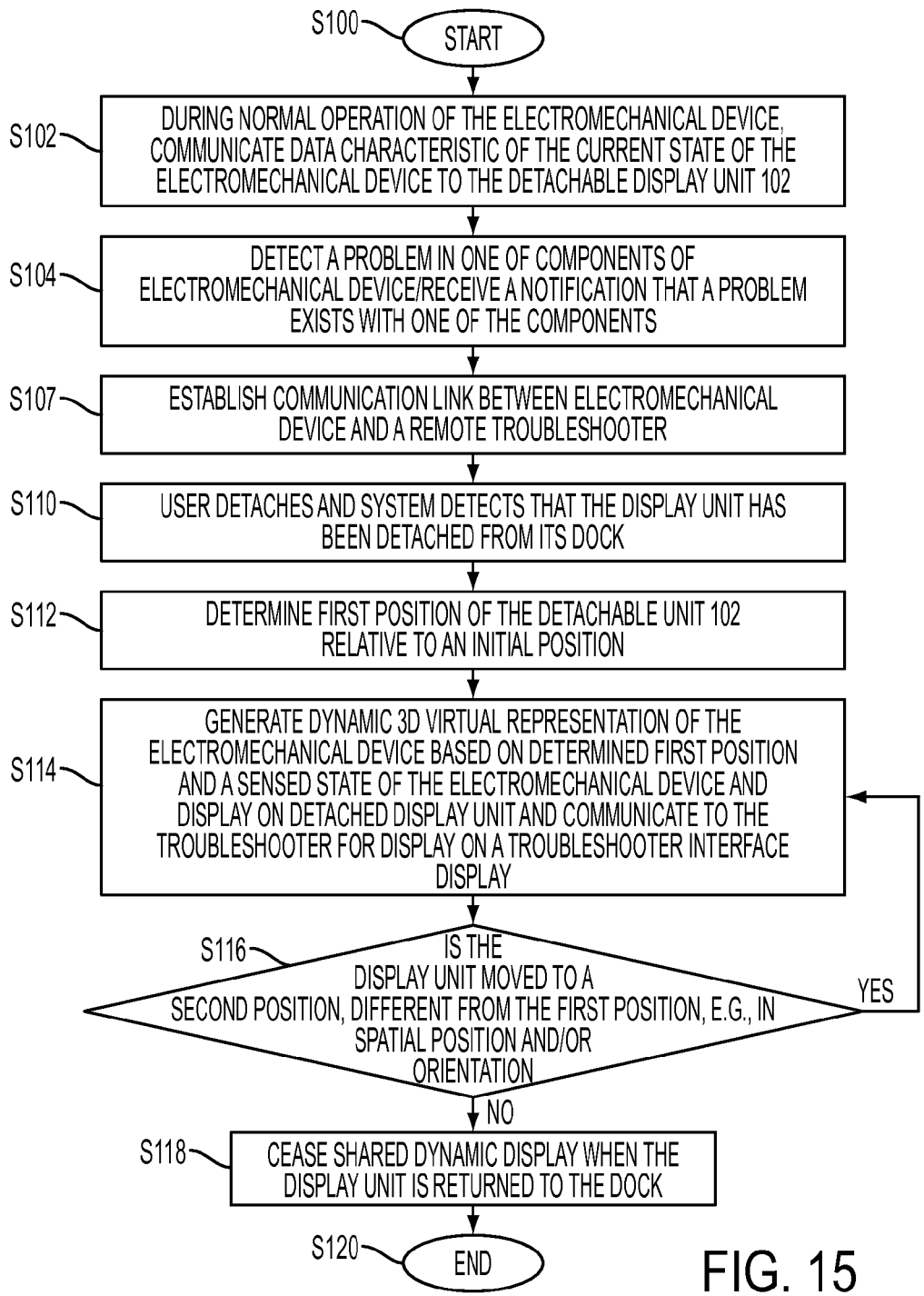
FIG. 15 illustrates a method which may be performed using the dynamic 3D virtual representation display system of FIG. 9.

FIG. 15 illustrates an exemplary method for generating a position responsive display of an electromechanical device, such as device 100. The method begins at S100.

At S102, during normal operation of the electromechanical device, data characteristic of the current state of the electromechanical device is communicated to the detachable display unit 102. The data may include, for example, user-selectable parameters for a job, such as printing, faxing, copying, depending on what functions are available on the device, such as the type of paper selectable, number of copies, etc. Once selected, the display may show the progress of a job, such as the number of copes to be printed, whether a fax is being sent etc.

At S104 the electromechanical device detects a problem in one of its components or receives a notification input by a user that a problem exists with one of the components.

At S107, the electromechanical device establishes a communication link with a remote troubleshooter.

At S110, user detaches and system detect that the display unit has been detached from its dock, e.g., by the sensor 304 and relayed to the position control unit 302.

At S112, a first current position of the unit 102 is determined, e.g., the 3D spatial position and orientation of the detachable display unit relative to a base position, such as the dock position.

At S114 a dynamic 3D virtual representation of the electromechanical device is generated and displayed, based on changes in the determined 3D spatial position and/or orientation. Relevant components to be actuated by the user are highlighted in the display. The user and troubleshooter can thus view the virtual representation and the actual components of the MFD to be actuated contemporaneously (or virtually contemporaneously). Data characteristic of the current state of the electromechanical device are updated as user actions are detected and communicated to the detachable display unit.

At S116, if the display unit is moved to a new current position, different from the first current position, e.g., in spatial position and/or orientation, S112 and S114 are repeated.

At S118, when the display unit is returned to the dock, the dynamic 3D shared virtual representation which changes in relation to the position of the display unit, is discontinued and the display unit returns to its normal operating mode.

The method ends at S120.

The method illustrated in FIG. 15 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 15, can be used to implement the method for generating a dynamic 3D display.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A communication system for supporting collaborative interactions between an electromagnetic device user and a troubleshooting advisor engaged in troubleshooting support activities for the electromechanical device, comprising:
an electromechanical device including a user detachable display unit detachably mounted to the device, the device and display unit configured to generate and display on the detachable display unit a dynamic virtual representation of the device including a model of the device orientated to a perspective of the device user's position relative to the device and a sensed state of the device, wherein a first communication link is configured to communicate data between the display unit and the device, the data being characteristic of the sensed state of at least one component of the electromechanical device; and
a remote troubleshooting interface configured to display the dynamic virtual representation of the device orientated to the perspective of the device user's position relative to the device and the sensed state of the device; wherein a second communication link is configured to provide bidirectional data communications between the electromechanical device and the remote troubleshooting interface,
wherein the communication system is configured to update the dynamic virtual representation of the device displayed on the detachable display unit based on a change in the position of the device user relative to the device and the sensed state of the device, and the communication system is configured whereby the dynamic virtual representation of the device is communicated by the second communication link to the remote troubleshooting interface and synchronized with the troubleshooting interface.

2. The communication system according to claim 1, the communication system configured to include a live mode, a frozen mode and a guided mode of operation.

3. The communication system according to claim 1, the communication system configured to support detection and correction of differences between the sensed state of the device and an observed state of the device by the user.

4. The communication system according to claim 1, wherein the dynamic virtual representation is one of 2D and 3D.

5. The communication system according to claim 1, wherein the remote troubleshooting interface is configured to include a second virtual representation of the device, not shared with the user.

6. The communication system according to claim 1, wherein the detachable display unit includes a pointing device, the detachable display unit configured to selectively point at a part of the device and the communication system configured to communicate the part to the troubleshooting interface.

7. The communication system according to claim 1, the communication system configured to display instructions to the user on the detachable display unit.

8. The communication system according to claim 7, wherein the instructions to the user are associated with changing the device from the sensed state to a desired state.

9. The communication system according to claim 1, the communication system configured to perform two or more of:

a) updating the dynamic virtual representation based on the user moving;
b) the user freezing the dynamic virtual representation;
c) the dynamic virtual representation including the indication by the user of a part associated with the device;
d) updating the dynamic virtual representation to include information associated with a second virtual representation associated with the troubleshooting interface;
e) updating a second virtual representation associated with the troubleshooting interface with information associated with the dynamic virtual representation;
f) guiding the user to perform actions to change the device from the sensed state to a desired state;
g) indicate a part on the dynamic virtual representation selected by the troubleshooter; and
h) modifying the dynamic virtual representation based on the user observed state of the device.

10. The communication system according to claim 1, wherein the device is one of a copier, a printer, a MFD, and a scanner.

11. A method for troubleshooting a device operatively associated with a communication system for supporting remote interactions between a device user and a troubleshooting advisor, the communication system including a user detachable display unit detachably mounted to the device and operatively connected to the device, a troubleshooting interface operatively connected to the device, and a communication link operatively connecting the detachable display unit and the remote troubleshooting interface, the method comprising:
a) the detachable display unit generating and displaying a virtual representation of the device including a model of the device orientated to a perspective of the device user's position relative to the device and a sensed state of the device;
b) the troubleshooting interface displaying the virtual representation of the device orientated to the perspective of the device user's position relative to the device and the sensed state of the device; and
c) dynamically updating the virtual representation of the device displayed on the detachable display unit based on a change in the position of the device user relative to the device and the sensed state of the device.

12. The method for troubleshooting a device according to claim 11, comprising:
operating the communication system in one of a live mode, a frozen mode and a guided mode.

13. The method for troubleshooting a device according to claim 11, comprising:
detecting differences between the sensed state of the device and an observed state of the device; and
modifying the virtual representation based on the detected differences.

14. The method for troubleshooting a device according to claim 11, wherein the virtual representation of the device is one of 2D and 3D.

15. The method for troubleshooting a device according to claim 11, comprising:
the troubleshooting interface displaying a second virtual representation of the device, not shared with the user.

16. The method for troubleshooting a device according to claim 11,
the detachable display unit including a pointing device, and the method comprising:
the user selectively pointing at a part associated with the device; and dynamically updating the virtual representation of the device to indicate the part.

17. The method for troubleshooting a device according to claim 11, comprising:
displaying on the detachable display unit instructions to the user from the troubleshooting advisor.

18. The method for troubleshooting a device according to claim 17, wherein the instructions to the user are associated with changing the device from the sensed state to a desired state.

19. The method for troubleshooting a device according to claim 11, the communication system performing two or more of:
a) updating the dynamic virtual representation based on the user moving;
b) the user freezing the dynamic virtual representation;
c) the dynamic virtual representation including the indication by the user of a part associated with the device;
d) updating the dynamic virtual representation to include information associated with a second virtual representation associated with the troubleshooting interface;
e) updating a second virtual representation associated with the troubleshooting interface with information associated with the dynamic virtual representation;
f) guiding the user to perform actions to change the device from the sensed state to a desired state;
g) indicate a part on the dynamic virtual representation selected by the troubleshooter; and
h) modifying the dynamic virtual representation based on the user observed state of the device.

20. The method for troubleshooting a device according to claim 11, wherein the device is one of a copier, a printer, a MFD and a scanner.

21. A printing system including an interactive communication system for supporting collaborative interactions between a printing system user and a troubleshooting advisor engaged in troubleshooting support activities for the printing system comprising:
a printer;
a user detachable display unit detachably mounted to the printer, the display unit configured to generate a dynamic virtual representation including a model of one or more areas of the printing system orientated to a perspective of the printing system user's position relative to the printing system and a sensed state of the printing system, wherein a first communication link is configured to communicate data between the display unit and the printer, the data being characteristic of the sensed state of at least one component of the printer;
a remote troubleshooting interface configured to display the dynamic virtual representation of the one or more areas of the printing system orientated to the perspective of the printing system user's position relative to the printing system and the sensed state of the printing system; and
wherein a second communication link is configured to provide bidirectional data communications between the printing system and the remote troubleshooting interface;
wherein the printing system is configured to update the dynamic virtual representation of the one or more areas of the printing system displayed on the detachable display unit based on a change in the position of the printing system user relative to the printing system and the sensed state of the printing system, and the printing system is configured whereby the dynamic virtual representation of the one or more areas of the printing system is communicated by the second communication link to the remote trouble shooting interface and synchronized with the troubleshooting interface.

22. The printing system according to claim 21, wherein the communication system configured to include a live mode, a frozen mode and a guided mode of operation.

23. The printing system according to claim 22, wherein the dynamic virtual representation is one of 2D and 3D.

24. The printing system according to claim 22, wherein the remote troubleshooting interface is configured to include a second virtual representation of the printing system, not shared with the user.

25. The printing system according to claim 22, the communication system configured to perform two or more of:
a) updating the dynamic virtual representation based on the user moving;
b) the user freezing the dynamic virtual representation;
c) the dynamic virtual representation including the indication by the user of a part associated with the printing system;
d) updating the dynamic virtual representation to include information associated with a second virtual representation associated with the troubleshooting interface;
e) updating a second virtual representation associated with the troubleshooting interface with information associated with the dynamic virtual representation;
f) guiding the user to perform actions to change the printing system from the sensed state to a desired state;
g) indicate a part on the dynamic virtual representation selected by the troubleshooter; and
h) modifying the dynamic virtual representation based on the user observed state of the printing system.

* * * * *